(12) United States Patent
Suzuki et al.

(10) Patent No.: US 6,351,497 B1
(45) Date of Patent: *Feb. 26, 2002

(54) COMMUNICATION SYSTEM

(75) Inventors: Mitsuhiro Suzuki, Chiba; Makoto Natori, Saitama, both of (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/539,007

(22) Filed: Mar. 30, 2000

Related U.S. Application Data

(62) Division of application No. 08/524,215, filed on Sep. 6, 1995.

(51) Int. Cl.[7] .......................... H04L 27/00; H04L 27/28
(52) U.S. Cl. ..................................... 375/259; 375/260
(58) Field of Search ................................... 375/259, 260

(56) References Cited

U.S. PATENT DOCUMENTS

| | | | |
|---|---|---|---|
| 3,898,566 A | * 8/1975 | Switzer et al. | 375/260 |
| 5,541,552 A | * 7/1996 | Suzuki et al. | 375/307 |
| 5,663,986 A | * 9/1997 | Striffler | 379/260 |
| 6,097,762 A | * 8/2000 | Suzuki et al. | 375/259 |

* cited by examiner

*Primary Examiner*—Stephen Chin
*Assistant Examiner*—Tony Al-Beshrawi
(74) *Attorney, Agent, or Firm*—Jay H. Maioli

(57) ABSTRACT

A communication system that can satisfactorily communicate with a mobile station by a transmitter and receiver of a simple arrangement, wherein a plurality of carriers having different frequencies are transmitted simultaneously and data is transmitted on the basis of a phase difference between the carriers. Also, the carriers are multiplied with a predetermined time waveform and transmitted, so that a reception side receives data by use of a time waveform narrower than the above time waveform.

4 Claims, 20 Drawing Sheets

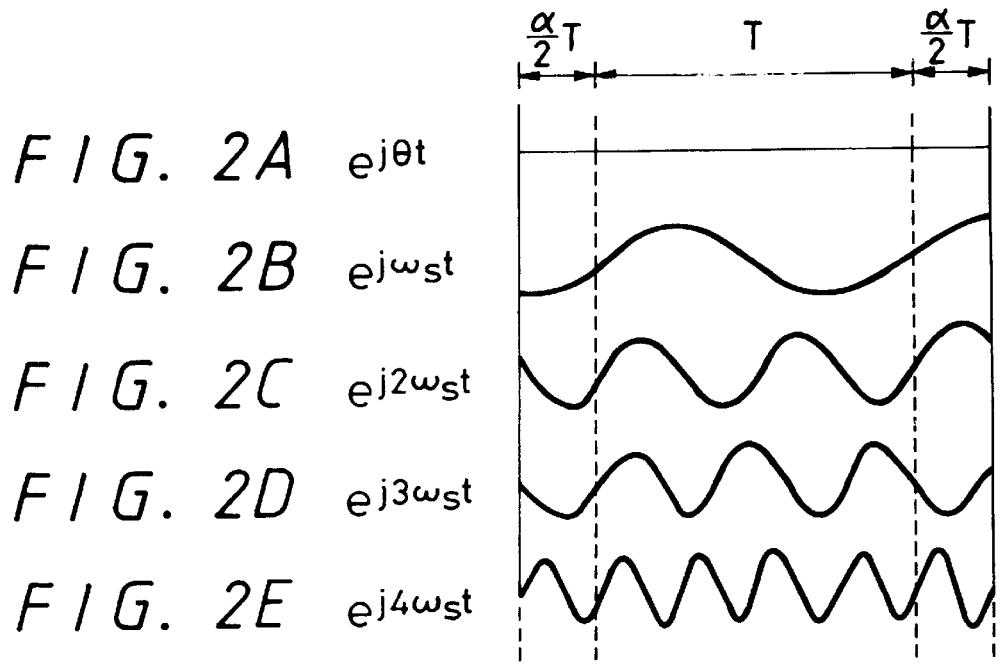
FIG. 2A $e^{j\theta t}$
FIG. 2B $e^{j\omega_s t}$
FIG. 2C $e^{j2\omega_s t}$
FIG. 2D $e^{j3\omega_s t}$
FIG. 2E $e^{j4\omega_s t}$
FIG. 3
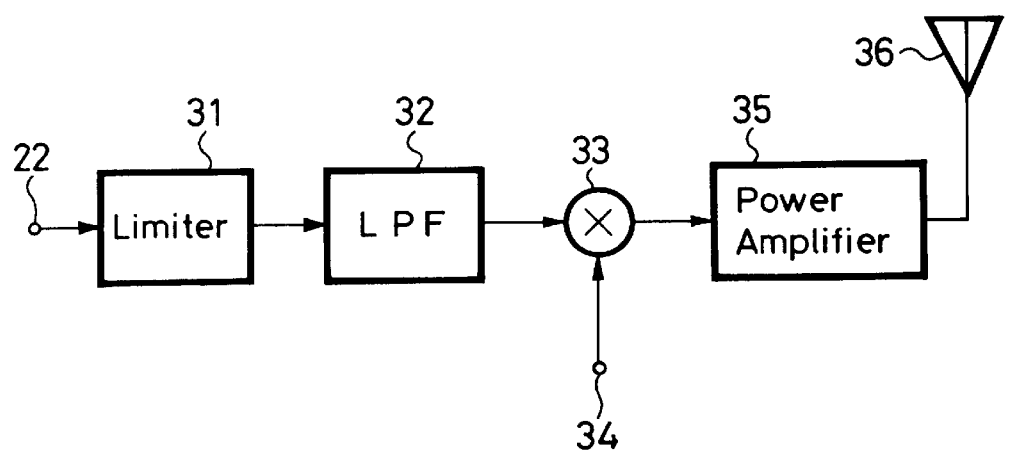

FIG. 4A  Amplitude Distribution of Modulated Waveform
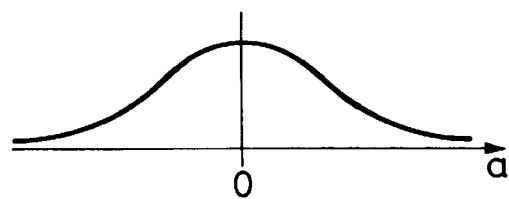
FIG. 4B  Amplitude Distribution of Limiter Output
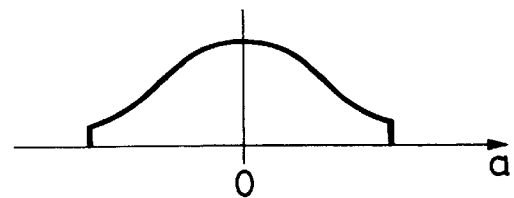
FIG. 4C  Amplitude Distribution of Filter Output
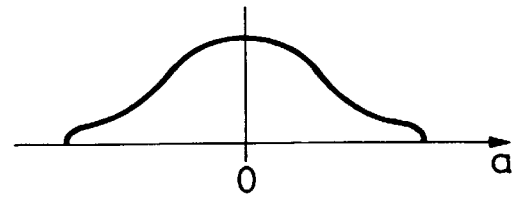

FIG. 5A  Modulated Waveform 
FIG. 5B  Limiter Output 
FIG. 5C  Filter Output 

F I G. 19A
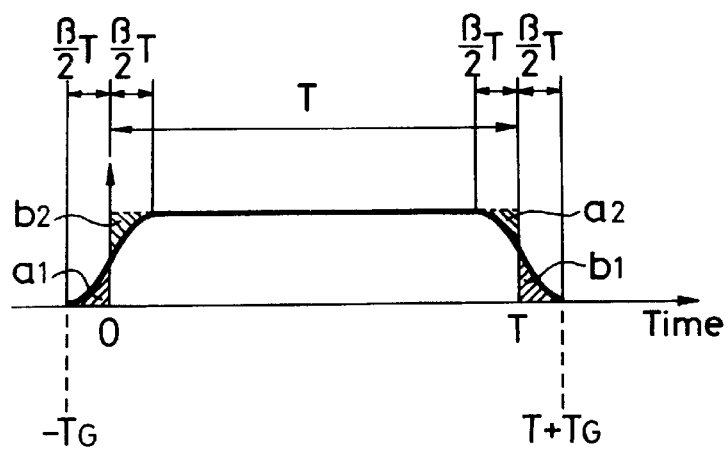
F I G. 19B
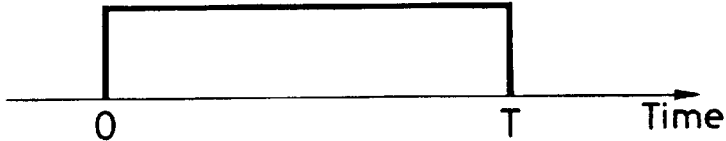

COMMUNICATION SYSTEM

This is a division of prior application Ser. No. 08/524,215 filed Sep. 6, 1995.

BACKGROUND OF THE INVENTION

The present invention relates to a transmission system for use in communicating with a mobile station.

A variety of mobile communication systems, such as a mobile telephone or portable telephone for communicating with a mobile station have heretofore been put into practice. The mobile communication system is fundamentally the same communication system is that for communicating with fixed stations.

A reception signal received at a mobile communication terminal, such as mobile telephone or portable telephone tends to be distorted due to the influence of multipath fading. Specifically, when the multipath fading occurs, a propagation delay between paths increases to cause an intersymbol interference. As a consequence, preceding and succeeding codes overlap each other to deteriorate a transmission characteristic.

In order to satisfactorily receive a reception signal even when the transmission characteristic is degraded, a sync (synchronizing) detecting circuit formed of an adaptive equalizer or a PLL (phase-locked loop) circuit has to be applied so that a receiver becomes complex in arrangement and expensive.

Furthermore, when a modulated waveform to be transmitted is changed with a probability distribution which is often referred to as a Gaussian distribution, a peak-to-peak value takes a large amplitude so that a signal transmitted via a transmission amplifier or the like is distorted and a spectrum of a modulated wave is widened to exert an adverse influence on the adjacent channel.

SUMMARY OF THE INVENTION

In view of the aforesaid aspect, it is an object of the present invention to provide a communication system which can satisfactorily communicate with mobile stations by a transmitter and receiver of a simple arrangement.

According to a first aspect of the present invention, there is provided a communication system which is comprised of transmission processing means for transmitting a plurality of carriers having different frequencies simultaneously and transmitting data on the basis of a phase difference between the carriers.

According to a second aspect of the present invention, there is provided a communication system which is comprised of modulating means for outputting a modulated output waveform in which an amplitude probability distribution is approximate to a Gaussian distribution, a limiter for amplitude-limiting an output waveform of the modulating means, and a filter for filtering out an output of the limiter, wherein the limiter amplitude-limits the mixed signal at a rate of about 1.5 times of standard deviation of amplitude distribution or greater and an output of the filter is transmitted.

According to a third aspect of the present invention, there is provided a communication system which is comprised of means for transmitting a plurality of carriers having different frequencies simultaneously, wherein a predetermined time waveform is multiplied with each of carriers.

According to a fourth aspect of the present invention, there is provided a communication system wherein signals are phase-modulated by a plurality of carriers having different frequencies and transmitted simultaneously. The communication system is comprised of carrier generating means for generating carriers and transmitting means for supplying phase values to the carrier generating means as initial phase values and sequentially adding phase values to the carriers at every sample interval to directly obtain data modulated into carriers.

BRIEF DESCRIPTION OF THE DRAWINGS

FIGS. 2A to 2E are diagrams used to explain examples of carriers according to the first embodiment of the present invention;

FIG. 3 is a block diagram showing an arrangement of a transmission signal output portion according to the first embodiment of the present invention;

FIGS. 4A to 4C are schematic diagrams used to explain the changes of amplitude distributions of waveforms in the transmission signal output portion according to the first embodiment of the present invention;

FIGS. 5A to 5C are waveform diagrams showing the changes of waveforms in the transmission signal output portion according to the first embodiment of the present invention;

FIGS. 19A and 19B are explanatory diagrams showing time waveforms for demodulation according to the ninth embodiment of the present invention;

DETAILED DESCRIPTION OF THE PREFERRED EMBODIMENTS

A first embodiment of the present invention will hereinafter be described with reference to FIGS. 1 through 7.

In this embodiment, the present invention is applied to a communication system wherein digital data is transmitted via radio waves. Digital data is transmitted by a transmission processing system shown in FIG. 1.

Figure 1:
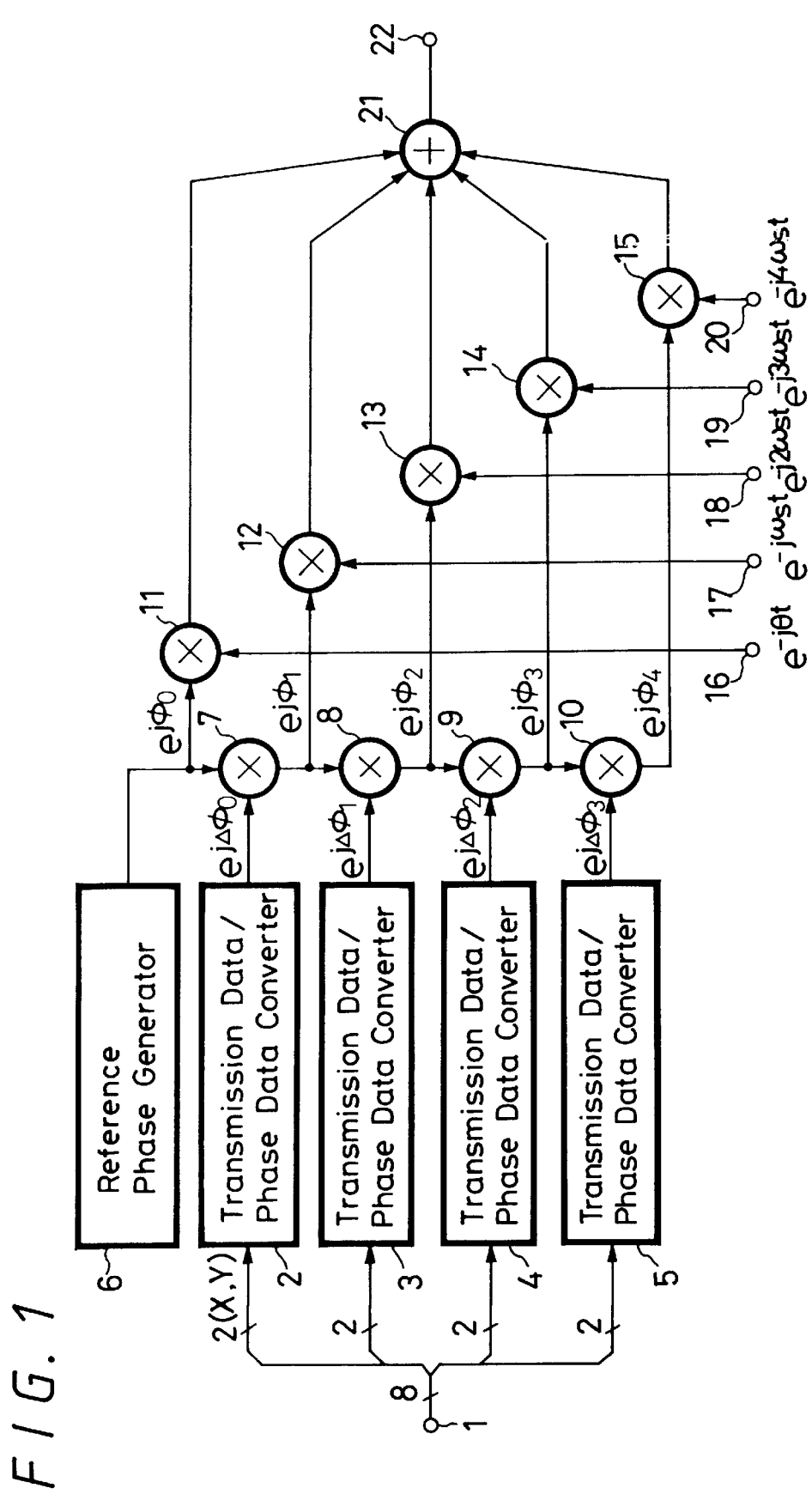
FIG. 1 is a block diagram showing an arrangement of a transmission processing system of a communication system according to a first embodiment of the present invention.

As shown in FIG. 1, 8-bit data is sequentially supplied to a transmission data input terminal 1 and 8-bit data is processed as one modulation unit by the circuit according to this embodiment. The 8-bit data is divided into 2-bit data each. The 2-bit data thus divided are supplied to transmission data/phase data converters 2, 3, 4, 5. The transmission data/phase data converters 2 through 5 generate phase data based on the states of 2-bit data [X, Y] supplied thereto. As the states of the 2-bit data [X, Y], there are considered four states expressed on the following table 1. The transmission data/phase data converters 2 through 5 generate different phase data $\Delta\phi$ at every four states.

TABLE 1

| X | Y | $\Delta\phi$ |
|---|---|---|
| 0 | 0 | $\pi/4$ |
| 1 | 0 | $3/4\,\pi$ |
| 1 | 1 | $-3/4\,\pi$ |
| 0 | 1 | $-\pi/4$ |

$\Delta\phi_0$, $\Delta\phi_1$, $\Delta\phi_2$ and $\Delta\phi_3$ represent the phase data that the four transmission data/phase data converters 2, 3, 4 and 5 output.

There is provided a reference phase data generator 6 which generates reference initial phase data $\phi_0$. The initial phase data $\phi_0$ is supplied to a phase multiplier 7 and a carrier multiplier 11. The phase data $\Delta\phi_0$ output from the transmission data/phase data converter 2 is supplied to the phase multiplier 7 which multiplies the initial phase data $\phi_0$ and the phase data $\Delta\phi_0$ supplied thereto to provide phase data $\phi_1$. The resultant phase data $\Delta_1$ is supplied to a phase multiplier 8 and a carrier multiplier 12.

The phase data $\Delta\phi_1$ output from the transmission data/phase data converter 3 is supplied to the phase multiplier 8 which multiplies the phase data $\phi_1$ and the phase data $\Delta\phi_1$ supplied thereto to provide phase data $\phi_2$. The resultant phase data $\phi_2$ is supplied to a phase multiplier 9 and a carrier multiplier 13.

The phase data $\Delta\phi_2$ output from the transmission data/phase converter 4 is supplied to a phase multiplier 9 which multiplies the phase data $\phi_2$ and the phase data $\Delta\phi_2$ supplied thereto to provide phase data $\phi_3$. The resultant phase data $\phi_3$ is supplied to a phase multiplier 10 and a carrier multiplier 14.

The phase data $\Delta\phi_3$ output from the transmission/phase data converter 5 is supplied to a phase multiplier 10 which multiplies the phase data $\phi_3$ and the phase data $\Delta\phi_3$ supplied thereto to provide phase data $\phi_4$. The resultant phase data $\phi_4$ is supplied to a carrier multiplier 15.

Therefore, the multipliers 7, 8, 9, 10 multiply the phase data $\Delta\phi_0$ to $\Delta\phi_3$ with the initial phase data $\phi_0$, in that order, to provide the phase data $\phi_1$ to $\phi_4$.

Carrier signals having different frequencies are supplied to first, second, third, fourth and fifth carrier input terminals 16, 17, 18, 19, 20, respectively. The frequencies of the carrier signals supplied to the input terminals 16, 17, 18, 19, 20 are each different by a constant angular frequency ωs. Specifically, the first, second, third, fourth and fifth carrier signals are changed as shown in FIGS. 2A, 2B, 2C, 2D and 2E. In actual practice, each carrier signal is a complex number signal.

The carrier multiplier 11 multiplies the carrier signal supplied to the first carrier input terminal 16 with the (initial) phase data $\phi_0$. The carrier multiplier 12 multiplies the carrier signal supplied to the second carrier input terminal 17 with the phase data $\phi_1$. The carrier multiplier 13 multiplies the carrier signal supplied to the third carrier input terminal 18 with the phase data $\phi_2$. The carrier multiplier 14 multiplies the carrier signal supplied to the fourth carrier input terminal 19 with the phase data $\phi_3$. The carrier multiplier 15 multiplies the carrier signal supplied to the fifth carrier input terminal 20 with the phase data $\phi_4$. As a consequence, the respective multipliers advance the phases of the carrier signal by the amounts indicated by the phase data.

Multiplied outputs from the carrier multipliers 11 to 15 are supplied to and mixed by a mixer 21. A mixed output signal from the mixer 21 is supplied to a transmission signal output terminal 22.

In the modulation effected by multiplication in each of the carrier multipliers 11 to 15, assuming that T is a time during which the angular frequency ωs, which is a frequency difference between carriers, is advanced by $2\pi$, then one modulation unit Tm is expressed as:

$$Tm = (1+\alpha)T \qquad (1)$$

Specifically, one modulation unit is a time which results from adding αT to the time T during which the angular frequency ωs advances by $2\pi$. FIGS. 2A through 2E are diagrams showing carriers obtained at one modulation unit. Although a phase difference is indicated only during the period T located at the central portion of one modulation unit, the same modulation is carried out during periods $(\alpha/2)T$ before and after the central portion T in actual practice.

Then, as shown in FIG. 3, the signal obtained at a transmission signal output terminal 22 is frequency-converted to a signal of a predetermined transmission channel (transmission frequency) and supplied to an antenna, which will be described later on, thereby making it possible to effect radio communication. In this embodiment, a transmission signal output unit can be arranged as shown in FIG. 3.

As shown in FIG. 3, the transmission signal obtained at the transmission signal output terminal 22 is supplied to a limiter 31 and an amplitude of the transmission signal is limited by the limiter 31. This limiter 31 effects a complex signal processing and an amplitude limiting carried out by the limiter 31 will be described below. As shown in FIG. 4A, there is the large possibility that an amplitude a of a waveform of the transmission signal will be changed in the form of Gaussian distribution. Therefore, as shown in FIG. 4B, the limiter 31 carries out a processing for limiting an amplitude about 1.5 times or higher than a standard deviation.

Then, an output of the limiter 31 is supplied to a filter 32 as shown in FIG. 3. The filter 32 is composed of a low-pass filter (LPF) to cancel out a high frequency band component of the signal limited by the limiter 31 so that the distribution of the amplitude a of the transmission signal is set in the state shown in FIG. 4C.

Therefore, the waveform of the actual transmission signal changes as shown in FIGS. 5A, 5B and 5C. Specifically, when a modulated waveform shown in FIG. 5A is developed at the terminal 22, the maximum amplitude portion of this waveform is limited by the limiter 31 and thereby a waveform shown in FIG. 5B is obtained. Further, The filter 32 cancels out the high frequency band component of the waveform portion thus amplitude-limited to provide a waveform shown in FIG. 5C.

A transmission signal thus processed and output from the filter 32 is supplied to a frequency converter 33. The frequency converter 33 frequency-converts the transmission signal supplied thereto by use of a transmission carrier corresponding to a transmission frequency supplied to a transmission carrier input terminal 34 to provide a frequency-converted transmission signal. The frequency-converted transmission signal from the frequency converter 33 is amplified by a power amplifier 35 and supplied to a transmission antenna 36, from which it is transmitted via radio waves.

Figure 6:
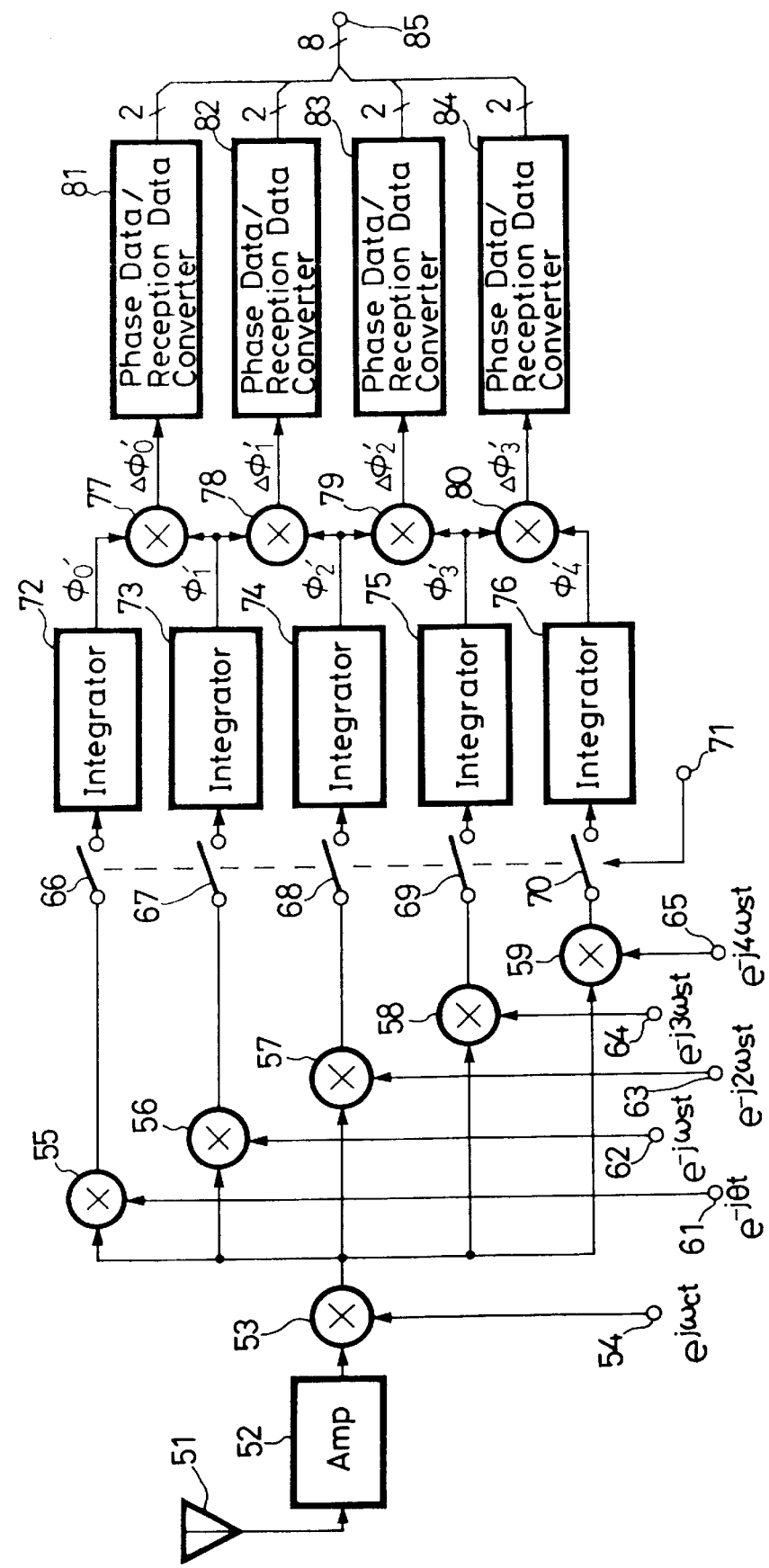
FIG. 6 is a block diagram showing an arrangement of a reception signal processing system of the communication system according to the first embodiment of the present invention.

An arrangement for receiving the thus transmitted signal will be described with reference to FIG. 6. As shown in FIG. 6, the signal thus transmitted from the antenna 36 (shown in FIG. 3) is received at a reception antenna 51. The signal received at the antenna 51 is amplified by an amplifier 52 and supplied to a frequency converter 53, in which it is frequency-converted into a baseband signal by use of a reception carrier supplied to a reception carrier input terminal 54. The baseband signal thus frequency-converted by the frequency converter 53 is supplied to five carrier multipliers 55, 56, 57, 58, 59. Carrier signals having different frequencies supplied to first, second, third, fourth and fifth carrier input terminals 61, 62, 63, 64, 65 are supplied to the carrier multipliers 55, 56, 57, 58, 59. Therefore, the carrier multipliers 55, 56, 57, 58, 59 multiply the baseband signals supplied thereto with the corresponding carrier signals to provide demodulated signals.

The frequencies of the carrier signals supplied to the first, second, third, fourth and fifth carrier input terminals 61, 62, 63, 64, 65 are selected to be the same as those of the carrier signals supplied to the terminals 16, 17, 18, 19, 20 of the transmission circuit shown in FIG. 1.

The demodulated signals from the carrier multipliers 55 through 59 are supplied through switches 66, 67, 68, 69, 70 to integrators 72, 73, 74, 75, 76, respectively. The switches 66, 67, 68, 69, 70 are turned on and off based on a switching control signal supplied to a control signal input terminal 71. The switches 66, 67, 68, 69, 70 are simultaneously turned on and off under the control of the switching control signal supplied thereto through the control signal input terminal 71.

Figure 7:
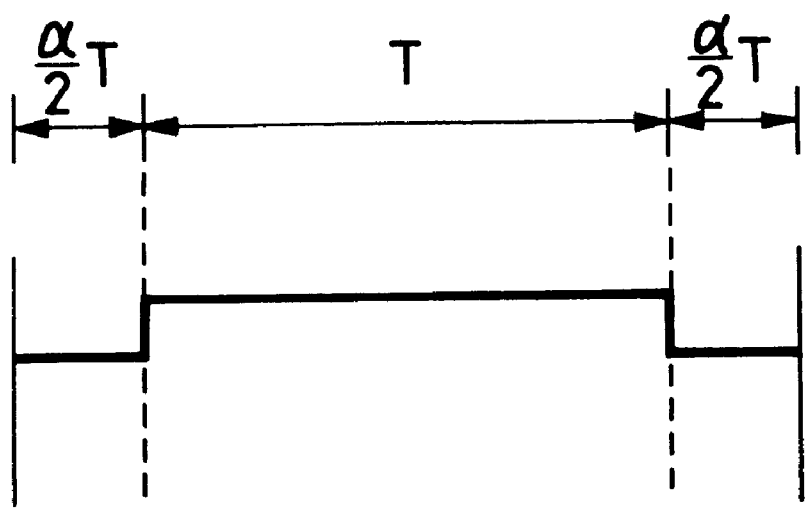
FIG. 7 is an explanatory diagram showing an integrating period of a reception processing according to the first embodiment of the present invention.

Each of the switches 66 through 70 is turned on and off at every one modulation unit of the transmitted signal. Specifically, although the transmission side shown in FIG. 1 employs the time which results from adding $\alpha T$ to the time during which the angular frequency $\omega s$ serving as the frequency difference between the carriers is advanced by $2\pi$ every modulation unit as one modulation unit, each of the switches 66 to 70 is closed during the period T located at the central portion of one modulation unit as shown in FIG. 7.

Therefore, when the switches 66 to 70 are closed during the central period T of each modulation unit, the demodulated signals supplied from the carrier modulators 55 to 59 are integrated by the integrators 72 to 76. In this embodiment, the thus integrated signals become phase data indicative of amounts wherein phases are changed during the integrated period (i.e., one modulation unit period). Phase data detected by the integrators 72 to 76 are represented as $\phi_0'$, $\phi_1'$, $\phi_2'$, $\phi_3'$, $\phi_4'$, respectively.

A phase multiplier 77 multiplies the phase data $\phi_0'$ detected by the integrator 77 and the phase data $\phi_1'$ detected by the integrator 73 to detect phase data $\Delta\phi_0'$ based on a phase difference between the two phase data $\phi_0'$ and $\phi_1'$. A phase multiplier 78 multiplies the phase data $\phi_1'$ detected by the integrator 73 and the phase data $\phi_2'$ detected by the integrator 74 to detect phase data $\Delta\phi_1'$ based on a phase difference between the two phase data $\phi_1'$ and $\phi_2'$. A phase multiplier 79 multiplies the phase data $\phi_2'$ detected by the integrator 74 and the phase data $\phi_3'$ detected by the integrator 75 to detect phase data $\Delta\phi_2'$ based on a phase difference between the two phase data $\phi_2'$ and $\phi_3'$. Further, a phase multiplier 80 multiplies the phase data $\phi_3'$ detected by the integrator 75 and the phase data $\phi_4'$ detected by the integrator 76 to detect phase data $\Delta\phi_4'$ based on a phase difference between the two phase data $\phi_3'$ and $\phi_4'$.

The phase data $\Delta\phi_0'$, $\Delta\phi_1'$, $\Delta\phi_2'$, $\Delta\phi_3'$ detected by the phase multipliers 77, 78, 79, 80 are supplied to phase data/ reception data converters 81, 82, 83, 84, respectively. The phase data/reception data converters 81 to 84 carry out conversions reverse to those that had been carried out by the transmission data/phase data converters 2, 3, 4, 5 when the transmission signal is transmitted. Specifically, the phase data/reception data converters 81, 82, 83, 84 determine that the phase data supplied thereto are closest to any one of the four phases ($\pi/4$, $3\pi/4$, $-3\pi/4$, $-\pi/4$) shown in the aforesaid table 1, and then convert thus determined phase values into 2-bit [X, Y] data shown in the table 1.

Some suitable means (not shown) synthesizes 2-bit data thus obtained from the converters 81 to 84 to provide 8-bit data and the 8-bit data is output from a reception data output terminal 85.

When the above-mentioned transmission processing and the above-mentioned reception processing are carried out, the bit data obtained at the terminal 1 of the transmission side is transmitted via radio waves and obtained at the terminal 85 of the reception side. Although a transmission processing in this case is a so-called multi-carrier system wherein a signal is transmitted by use of a plurality of carriers, it is a processing wherein data is transmitted based on the phase difference between the carriers. Accordingly, the reception side detects transmission data only by detecting the phase difference after the phase of each carrier had been detected. Therefore, unlike the case that data is modulated in the carrier, a transmission clock need not be reproduced. Hence, data can be transmitted and received by a simple circuit arrangement which does not need a complicated synchronizing circuit such as a PLL (phase-locked loop) circuit.

According to the inventive transmission processing, since only phase difference information is transmitted, data can be transmitted with small intersymbol interference even in a transmission line having a large dispersion of delay. Therefore, even when the communication system according to the present invention is applied to a transmission system such as a mobile communication system, for example, data can be transmitted accurately. In this case, a dynamic range of a communication waveform can be minimized without a deterioration of transmission characteristic and an interference to the adjacent channel can be minimized. Further, an interference from the adjacent channel can be avoided even if a timing shift is allowed a little. Moreover, it is possible to remove the influence exerted by each carrier provided for the respective channels upon the other carriers.

Further, since the carrier need not be reproduced by a PLL circuit on the reception side, even when the reception condition is not satisfactory and a signal-to-noise ratio (S/N) is low, it becomes possible to receive data satisfactorily.

Furthermore, according to this embodiment, since one modulation unit on the transmission side is given the small additional time period ($\alpha T$ in the equation (1)) and the phase is detected during the period from which the addition time period is removed on the reception side, it becomes possible to satisfactorily receive data from this standpoint.

Furthermore, according to this embodiment, since the transmission system is composed of the limiter 31 for amplitude-limiting the mixed signal of the modulated carriers and the filter 32 for filtering out the output of the limiter 31 to limit the amplitude about 1.5 times as high as the standard deviation of the amplitude distribution, even though the peak-to-peak value of the transmission waveform is increased when the carriers are mixed, it is possible to transmit data satisfactorily without distorting the transmission waveform.

The processing system composed of the limiter 31 and the filter 32 can be applied to a transmission circuit of other systems than the transmission circuit according to this embodiment, i.e., various circuits which can output modulated output waveforms wherein a probability distribution of amplitude is approximate to a Gaussian distribution.

While the amplitude about 1.5 times the standard deviation of the amplitude distribution is limited as described above, the present invention is not limited thereto and an amplitude is limited by a predetermined value of more than 1.5 times of the standard deviation of the amplitude distribution.

Further, while the 2-bit of 8-bit data are converted into the phase difference data and transmitted by use of five carriers as described above, the present invention is not limited thereto and much more data can simultaneously be transmitted by use of many more carriers or the number of carriers can be lessened.

As the transmission processing and the reception processing, there can be used other transmission processing and reception processing so long as they can transmit data based on the phase difference between the carriers.

The reason that data can be satisfactorily transmitted based on the phase difference between the carriers according to this embodiment will be described with reference to the following equations. A waveform of the transmission signal obtained by the transmission circuit shown in FIG. 1 is expressed by the following equation (2):

$$x(t) = \sum_{L=0}^{N} e^{-j\phi L} e^{-j(\omega c + L\omega s)t} \quad (2)$$

In the case of the arrangement shown in FIG. 1, since five carriers are used to transmit the phase difference, N in the equation (2) becomes 4. The equation (2) indicates that the four carriers are spaced apart in frequency by $\omega s$. In the equation (2), $\omega c$ represents a transmission frequency (i.e., frequency converted by the frequency converter 33 in FIG. 3).

Then, if the transmission line has no delayed wave or the like, then a phase $\phi_p$ modulated by Pth carrier is obtained by the following equation (3):

$$Te^{j\phi p'} = \int_{(T)} X(t) e^{+j(\omega c + p\omega s)t} dt \quad (3)$$

(T) is the time of period which includes the modulated signal of one modulation unit. Expanding the equation (3), we have:

$$Te^{j\phi p'} = \int_{(T)} \sum_{L=0}^{N} e^{j\phi} L e^{-j(p-L)\omega s t} dt \quad (4)$$
$$= Te^{j\phi p}$$

Accordingly, the above-mentioned equation (4) reveals that the phase $\phi_p$ modulated on the transmission side and the phase $\phi_p'$ demodulated on the reception side are equal to each other so that a perfect transmission is possible. Assuming now that the transmission line has a delay dispersion, then an impulse response thereof is expressed by the following equation (5):

$$m(t) \triangleq \sum_{k=0}^{M-1} m_k \delta(t - \tau_k) \quad (5)$$

In the equation (5), M represents the number of delayed waves, $\tau k$ represents the delay time of each delay path and mk represents a complex number amplitude of each delay path. If the impulse response is obtained as described above, then the reception signal can be obtained by composing the equations (2) and (3) and therefore obtained by the following equation (6):

$$y(t) \triangleq x(t) * m(t) \quad (6)$$
$$= \sum_{L=0}^{N} \sum_{k=0}^{M-1} mk e^{jpL} e^{-j(\omega c + L\omega s)(t - \tau k)}$$

Under the condition that the transmission path has the delay dispersion, the phase $\phi_p'$ demodulated on the reception side is obtained by the following equation:

$$Te^{j\phi p'} = \int_{(T)} y(t) e^{+j(\omega c + p\omega s)t} dt \quad (7)$$
$$= \int_{(T)} \sum_{L=0}^{N} \sum_{k=0}^{M-1} mk e^{(\omega c + L\omega s)k} e^{j\phi L} e^{j(p-L)\omega s t} dt$$
$$= Te^{j\phi p} \sum_{k=0}^{M-1} mk e^{+j(\omega c + p\omega s)\tau k}$$

Inasmuch as a differential phase $\Delta \phi_p'$ detected on the reception side is a difference between (P+1)th carrier phase and Pth carrier phase, it can be obtained by the following equation (8):

$$e^{j\Delta\phi p'} = e^{j\phi p+1'} e^{-j\phi p'}$$
$$= e^{j\phi p+1} e^{-j\phi p} \sum_{k=0}^{M-1} mk e^{-j(\omega c+(p-1)\omega s)\tau k} \sum_{l=0}^{M-1} \overset{*}{m}1^{-j(\omega c+p\omega s)\tau}$$
$$= e^{j\Delta\phi p} \left[ e^{j\omega s\tau k} \times \left\{ |mk|^2 + \sum_{L>k}^{M-1} 2\text{Re}\{mk\overset{*}{m}e\}\cos\{(\omega c + p\omega s)(\tau k - \tau l)\} \right\} \right]$$

(8)

If now the modulation time T is selected to be sufficiently larger than the delay dispersion τk, then we have the following equations (9) and (10):

$$\tau k < T \quad (9)$$

$$e^{j\omega s \tau k} = 1 \quad (10)$$

Therefore, phase information $\phi_p'$ demodulated on the reception side is provided by multiplying phase information $\phi_p$ transmitted from the transmission side with real number term $a_p$ and expressed by the following equation (11):

$$e^{j\Delta\phi p'} = e^{j\Delta\phi p} a_p \quad (11)$$

The above-mentioned equation (11) reveals that the real number does not affect phase information so that phase information can be transmitted accurately. Also, there occurs no intersymbol interference.

The description that had been made so far by use of the equations can be applied to other modulated waves allocated on the adjacent channels. It is clear that other channels can be prevented from being affected by a small timing shift.

Having examined by use of the above-mentioned equations that the communication system according to the present invention is applied to the mobile communication system in actual practice, in a cellular system wherein a telecommunication is made between a base station and a terminal station serving as a mobile station in the service area over a radius of 1 km from the base station, for example, a delay dispersion falls in a range of about 10 to 20 microseconds. Moreover, it is assumed that a time fluctuation period due to the fading falls in a range of about 1/100 Hz=10000 microseconds where a carrier frequency is 800 MHz and a moving speed of the terminal station is 100km/hour. If the communication system according to this embodiment is used under the above-mentioned conditions, the modulation time T of one modulation unit falls in a range of about 100 to 1000 microseconds.

Figure 8:
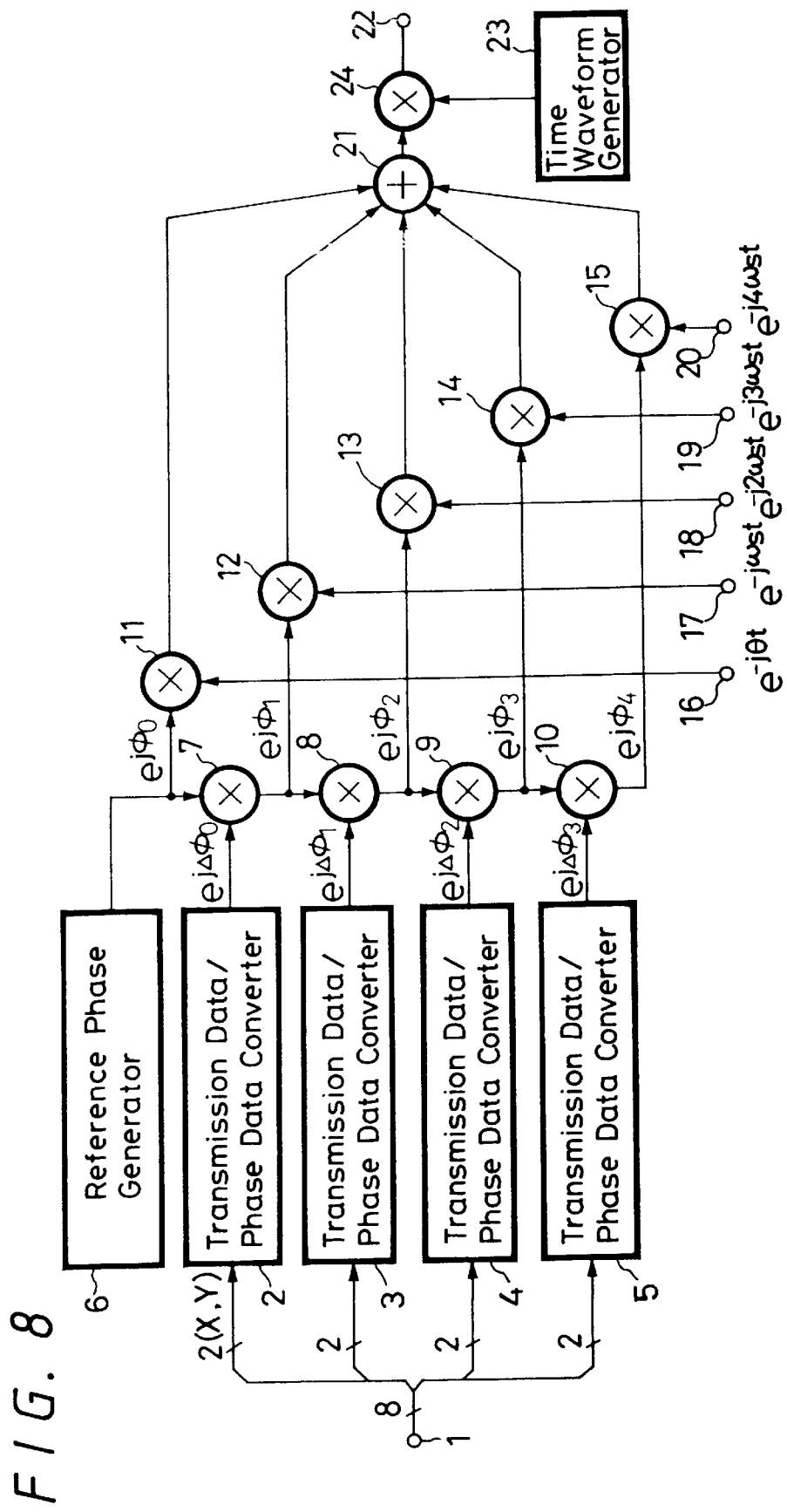
FIG. 8 is a block diagram showing a transmission processing system of the communication system according to a second embodiment of the present invention.
Figure 9:
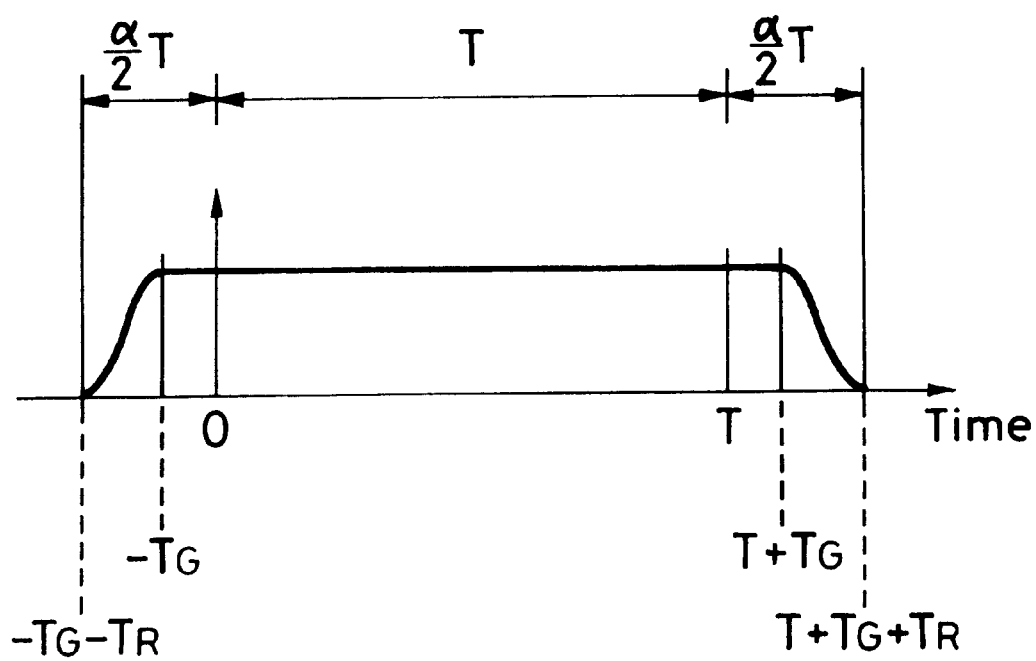
FIG. 9 is an explanatory diagram showing a time waveform for modulation according to the second embodiment of the present invention.

A communication system according to a second embodiment of the present invention will be described with reference to FIGS. 8 and 9. In FIGS. 8 and 9, like parts corresponding to those of FIGS. 1 to 7 are marked with the same references and therefore need not be described in detail.

According to this embodiment, similar to the example shown in FIG. 1, the present invention is applied to a communication system wherein digital data is transmitted and received via radio waves. FIG. 8 shows an arrangement of a transmission system. The transmission processing circuit shown in FIG. 8 is the same in arrangement as that of the transmission processing circuit shown in FIG. 1 where the outputs of the carrier multipliers 11 to 15 are mixed by the mixer 21. Then, the output of the mixer 21 is supplied to a multiplier 24 for multiplying a time waveform. A time waveform output from a time waveform generator 23 is multiplied with a transmission signal at every modulation unit by the multiplier 23 and a multiplied signal is supplied to an output terminal 22.

FIG. 9 shows an example of a time waveform output from the time waveform generator 23. This time waveform is multiplied with the transmission signal at every modulation unit. A data format of one modulation unit will be described initially. One modulation unit Tm is the time having the spare time αT shown in the equation (1). This spare time αT is divided into two portions (α/2)T and located before and after the central data body portion T.

This time waveform holds a constant level at the central data body portion T. Of the spare times (α/2)T located before and after the data body portion T, predetermined intervals (interval from $-T_G$ to 0 and interval from T to $T+T_G$) adjoining the data body portion T are employed as guard time portions. The guard time portions have the waveform having the same constant level as that of the data body portion T. Remaining spare time portions are employed as lamp portions (interval from $-T_G-T_R$ to $T_G$ and interval from $T+T_G+T_R$). These ramp portions have waveforms which are raised to the constant level. The raised waveform is the waveform of a curve shown by odd function (odd-symmetry function in the leading and trailing edges) of a linear sine (or cosine) function.

The above-mentioned time waveform is multiplied with the transmission signal, whereby the reception side for receiving the transmission signal can receive a signal of every modulation unit with ease. In particular, the time waveform is selected to be the time waveform which changes in the form of a curve such as a sine wave in the ramp portions. Therefore, since the time waveform is multiplied with the transmission signal, a higher harmonic is not generated and digital data can be transmitted satisfactorily.

Figure 10:
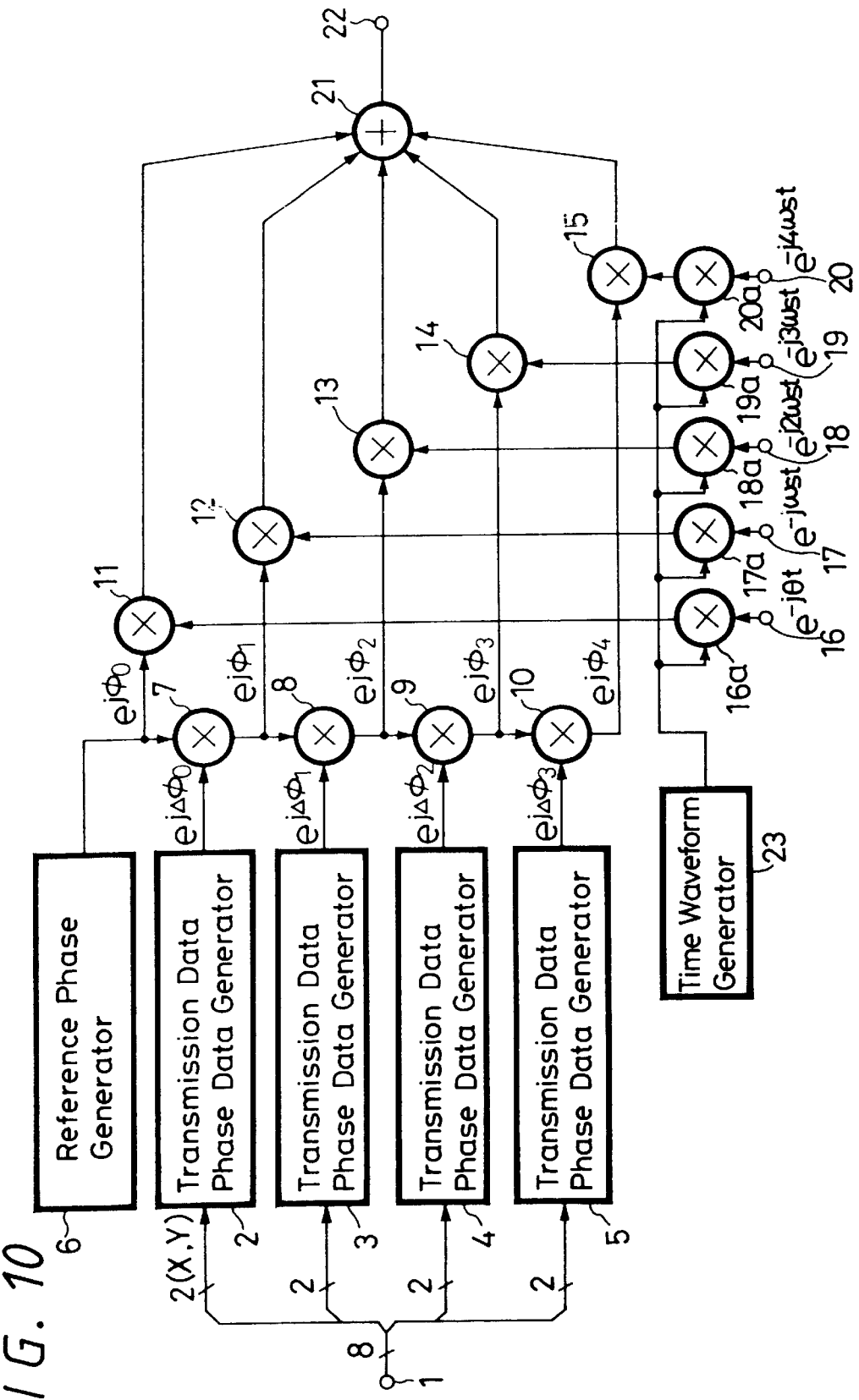
FIG. 10 is a block diagram showing an arrangement of a transmission processing system of a communication system according to a third embodiment of the present invention.

A communication system according to a third embodiment of the present invention will be described with reference to FIG. 10. In FIG. 10, like parts corresponding to those of FIGS. 1 to 9 are marked with the same references and therefore need not be described in detail.

According to this embodiment, similar to the example shown in FIG. 1, the present invention is applied to a communication system wherein digital data is transmitted and received via radio waves. The transmission processing circuit shown in FIG. 10 is arranged as a circuit for multiplying a transmission signal with a time waveform similar to the transmission processing circuit shown in FIG. 8. In this embodiment, carrier signals having different frequencies obtained at the first, second, third, fourth and fifth carrier input terminals 16, 17, 18, 19 and 20 are supplied to multipliers 16a, 17a, 18a, 19a and 20a, in which they are multiplied with time waveforms of every modulation unit output from the time waveform generator 23. The carrier signals having different frequencies multiplied with time waveforms are supplied to the carrier multipliers 11, 12, 13, 14 and 15, in which they are multiplied with the phase data $\phi_0, \phi_1, \phi_2, \phi_3, \phi_4$.

The time waveform of every modulation unit output from the time waveform generator 23 becomes such as the one shown in FIG. 9.

A rest of the arrangement is similar to that of the transmission processing circuit shown in the example of FIG. 8.

Since the carrier signals are directly multiplied with the time waveforms, a transmission signal similar to that obtained when the time waveform is multiplied with the signal which results from mixing the signals modulated by the carrier signals. Therefore, it becomes possible for the reception side to receive the transmission signal of one modulated unit with ease.

Figure 11:
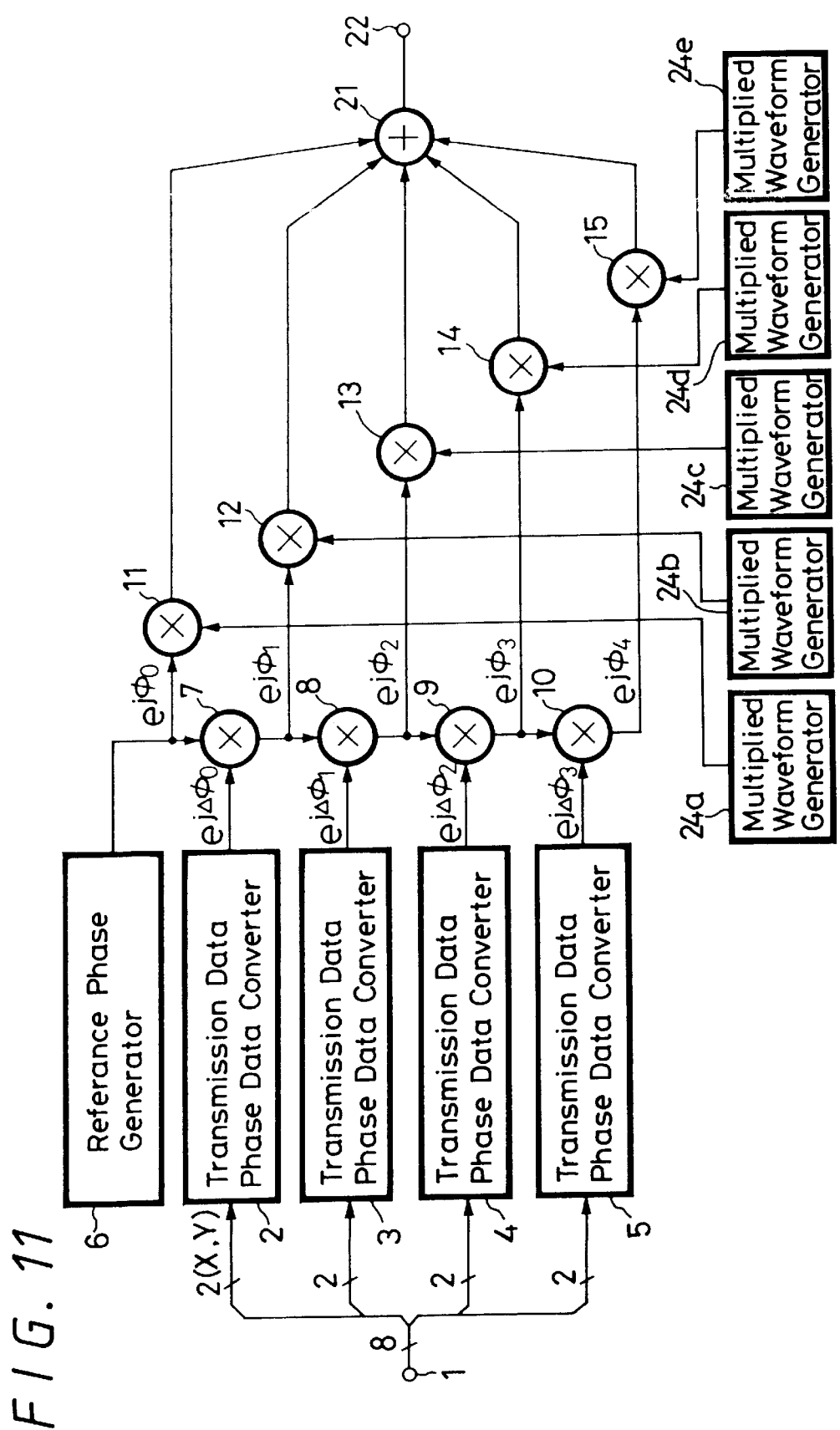
FIG. 11 is a block diagram showing an arrangement of a transmission processing system of a communication system according to a fourth embodiment of the present invention.

A communication system according to a fourth embodiment of the present invention will be described with reference to FIG. 11. In FIG. 11, like parts corresponding to those of FIGS. 1 to 10 are marked with the same references and therefore need not be described in detail.

In this embodiment, multiplied signals are directly output instead of multiplying the carriers with the time waveforms shown in FIG. 10. Specifically, as shown in FIG. 11, there are provided carrier/time multiplied waveform generators 24a, 24b, 24c, 24d, 24e. The generators 24a, 24b, 24c, 24d, 24e generate multiplied signals where first, second, third, fourth and fifth carriers are multiplied with the time waveform shown in FIG. 9. Outputs of the generators 24a to 24e are supplied to the carrier multipliers 11, 12, 13, 14, 15, respectively.

The rest of the arrangement is similar to that of the transmission processing circuit shown in FIG. 10.

In accordance with this embodiment, it is possible to obtain the multiplied signals wherein the carriers are multiplied with time waveforms by a simple arrangement which does not need the multipliers. Specifically, since the curve portion of the time waveform is a sine wave, a multiplication of the sine wave function can be converted into a sum of two trigonometric functions and a division of $2^n$ on the basis of an addition theorem of trigonometric function. Therefore, the carrier/time multiplied waveform generators 24a to 24e can be realized by simple circuit arrangements which do not need multiplication.

The fact that the multiplied signals of the time waveform and the carriers can be realized by the simple circuit arrangements which do not need multiplication will be described with reference to the following equations. A signal obtained at the output terminal 22 when the time waveform is multiplied with the carriers is expressed by the following equation (12):

$$x(t) = u(t) \sum_{L=0}^{4} e^{j\phi L} \times e^{jL\omega ct} \quad (12)$$

$$u(t) =
\begin{cases}
1 : -T_G \leq t < T + T_G \\
0 : t < -T_R - T_G t \geq T + T_G + T_G \\
\frac{1}{2}\left[1 - \cos\left\{\frac{\pi}{T_R}\left(t + T_G + \frac{1}{2}T_R\right)\right\}\right] : -T_R - T_G \leq t < -T_G \\
\frac{1}{2}\left[1 + \cos\left\{\frac{\pi}{T_R}\left(t - T_G - \frac{1}{2}T_R\right)\right\}\right] : T + T_G \leq t < T + T_R + T_G
\end{cases}$$

where $\omega_c = 2\pi/T$.

Then, the output signals of the carrier/time multiplied waveform generators 24a to 24e are presented as follows in response to 1=0, 1 . . . 4.

$$y_L(t) = u(t)e^{jL\omega ct} \quad (13)$$

A calculation of $Y_L(t)$ is effected by a simple equation without quadratic expression of trigonometric functions and expressed by the following equation (14) during the interval of $-T_R - T_c \leq t < -T_G$.

$$y_L(t) = \frac{1}{2}\left[1 - \cos\left\{\frac{\pi}{T_R}\left(t + T_G + \frac{1}{2}T_R\right)\right\}\right]\{\cos(1\omega ct) + j\sin(1\omega ct)\} \quad (14)$$

If the equation (14) is substituted with α and β as follows:

$$\alpha = \frac{\pi}{T_R}\left(t + T_G + \frac{1}{2}T_R\right) \quad (15)$$

$$\beta = 1\omega_c t$$

$$\beta = 1\omega_c t \quad (15)$$

If the equations (14) is replaced with the equation (15) as described above, it is possible to obtain the multiplied signal of the carrier and the time waveform expressed by the following equation (16):

$$Y_L(t) = \frac{1}{2}\{1 - \cos\alpha\}\{\cos\beta + j\sin\beta\} \quad (16)$$

$$= \frac{1}{2}\{\cos\beta - \cos(\alpha + \beta) - \cos(\alpha - \beta)\} -$$

$$\frac{1}{2}j\{\sin\beta - \sin(\alpha + \beta) - \sin(\alpha - \beta)\}$$

Further, the multiplied signals of the carriers and the time waveform can be obtained by the similar calculation during the interval of $T+T_G \leq t < T+T_G+T_R$. Accordingly, the output signals from the carrier/time multiplied waveform generators 24a to 24e can be obtained by the calculation of the sum of trigonometric functions and the simple division.

In actual practice, each of the carrier/time multiplied waveform generators 24a to 24e may include a ROM table (memory) in which there are stored values of respective sample points of time waveforms and a ROM table in which that are stored values of respective sample points of carriers having different frequencies. Then, the multiplied signals can be obtained by calculating the values read out from the two ROM tables in accordance with the above-mentioned equations. Alternatively, there is provided a ROM table in which there are stored values which result from analyzing multiplied values of the carriers and the time waveforms obtained at respective sample points obtained by the above-mentioned calculation. Then, the above-mentioned values may be sequentially read out from the ROM table.

The simplified arrangement for multiplying the carriers having different frequencies and the time waveforms can be applied to other communication system than the communication system in which data can be transmitted based on the phase difference between the carriers. Specifically, the present invention can be applied to any one of a multi-carrier system for transmitting a plurality of carriers and a system using a single carrier so long as the system is a transmission system in which time waveforms have to be superimposed continuously. The circuit arrangement necessary for a calculation processing can be simplified.

Figure 12:
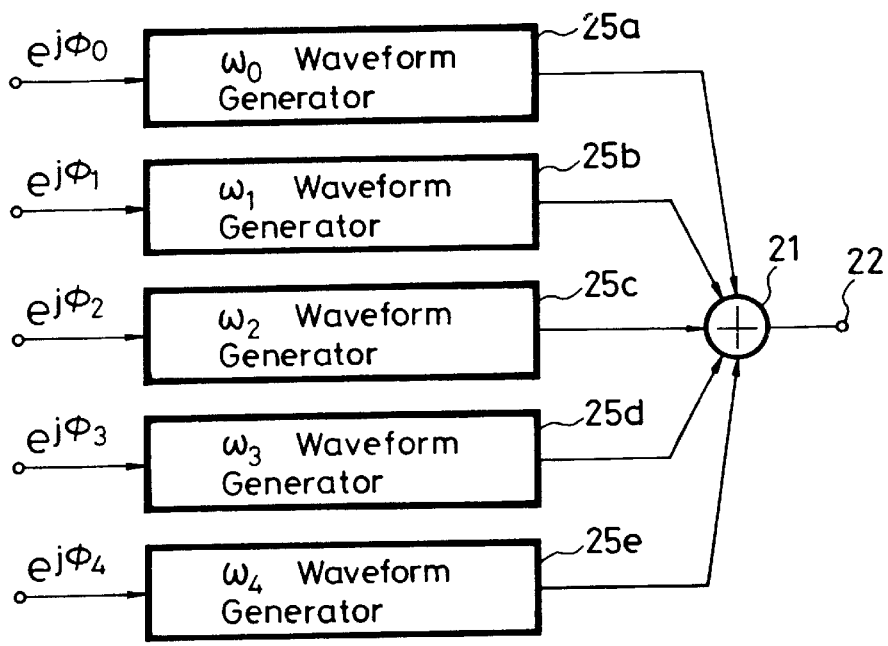
FIG. 12 is a block diagram showing an arrangement of a transmission processing system of a communication system according to a fifth embodiment of the present invention.
Figure 13:
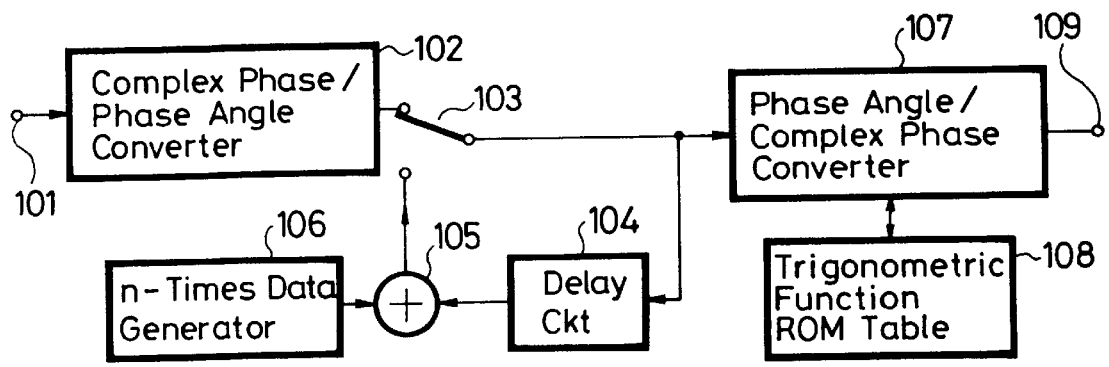
FIG. 13 is a block diagrams showing a specific arrangement of a waveform generator used in the fifth embodiment of the present invention.

A communication system according to a fifth embodiment of the present invention will be described with reference to FIGS. 12 and 13. In FIGS. 12 and 13, like parts corresponding to those of FIGS. 1 to 11 are marked with the same references and therefore need not be described in detail.

In this embodiment, the present invention is applied to the transmission processing circuit of the communication system wherein digital data is transmitted and received similarly to the example shown in FIG. 1. According to this embodiment, the processing for multiplying carriers and phase data can be simplified. Specifically, the transmission processing circuit is arranged as shown in FIG. 12. As shown in FIG. 12, the initial phase data $\phi_0$ output from the reference phase data generator 6 shown in FIG. 1 is supplied to a $\omega_0$ waveform generator 25a, the phase data $\phi_1$ output from the phase multiplier 7 is supplied to a $\omega_1$ waveform generator 25b, the phase data $\phi_2$ output from the phase multiplier 8 is supplied to a $\omega_2$ waveform generator 25c, the phase data $\phi_3$ output from the phase multiplier 9 is supplied to a $\omega_3$ waveform generator 25d, and the phase data $\phi_4$ output from the phase multiplier 10 is supplied to a $\omega_4$ waveform generator 25e, respectively. The above-mentioned generators 25a to 25e take the phase data supplied thereto at every one modulation unit as the initial phase values and add phase values to the initial phase values at every sample interval sequentially to thereby obtain carrier-modulated phase data. Thus, there can be obtained phase-modulated transmission signals. A mixer 21 mixes the transmission signals supplied thereto to provide a mixed signal of supplied to the transmission signal output terminal 22.

The rest of the arrangement is similar to that of the transmission circuit shown in FIG. 1.

FIG. 13 shows an arrangement of each of the $\omega_n$ waveform generators 25a to 25e. As shown in FIG. 13, phase data supplied to an input terminal 101 is supplied to a complex phase/phase angle converter 102, in which phase data is judged and converted into angle data. If phase data is four-phase modulated data, then it is sufficient to determine in which quadrant the phase data exists. Therefore, it is sufficient that the four angle data are provided as conversion values.

Resultant angle data is supplied through a switch 103 to a phase angle/complex phase converter 107 as an initial phase value and is also supplied through a delay circuit 104 to an adder 105. The phase angle/complex phase converter 107 converts data read out from the trigonometric function ROM table 108 into a complex phase waveform signal. The complex phase waveform signal thus converted is output from an output terminal 109.

The initial phase value supplied through the delay circuit 104 to the adder 105 is added with an output of n-times data generator 106 for generating n-times data of the phase angle of one sample. An output of the adder 105 is supplied through the switch 103 to the phase angle/complex phase converter 107 and from the delay circuit 104 to the adder 105.

Accordingly, in the initial state, the switch 103 is connected to the complex phase/phase angle converter 102 side and then changed in position to the adder 105 side, whereby n-times data of the phase angle of one sample is sequentially added at every sample and then supplied to the phase angle/complex phase converter 107. Thus, the complex phase waveform output from the output terminal 109 becomes a signal which results from directly modulating (complex) phase data by the carrier.

Since the signal, which is directly modulated by the carrier, is obtained, the carrier multipliers 11 to 15 shown in FIG. 1 need not be provided, thereby making it possible to reduce the circuit scale of the multi-carrier system transmission circuit and to lessen an amount of calculation processing.

While the present invention is applied to the communication system wherein data is transmitted based on the phase difference between the carriers as described above, the present invention is not limited thereto and can be applied to other communication systems so long as they are of the multi-carrier system for simultaneously transmitting a plurality of carriers.

Figure 14:
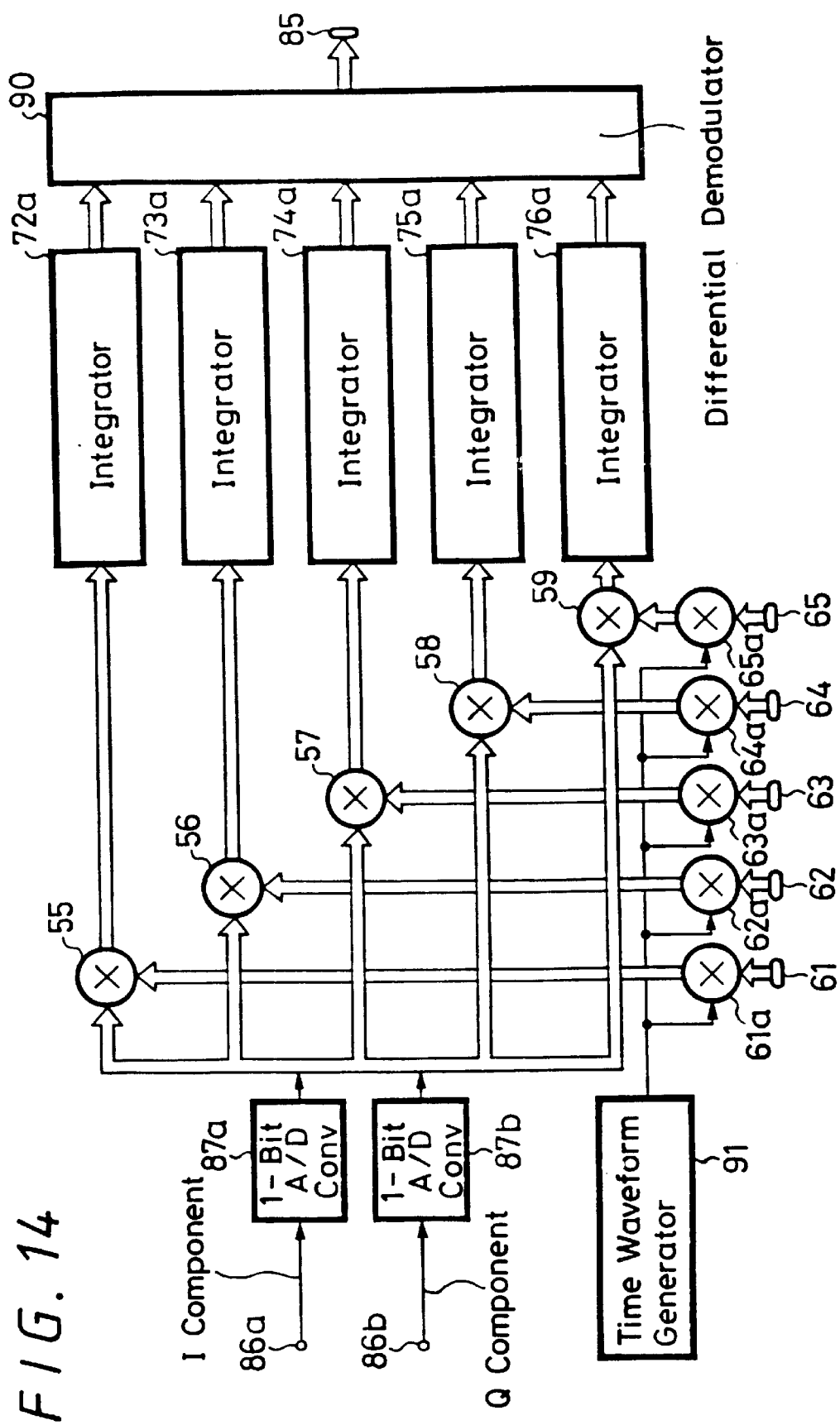
FIG. 14 is a block diagram showing an arrangement of a reception processing system of a communication system according to a sixth embodiment of the present invention.
Figure 15:
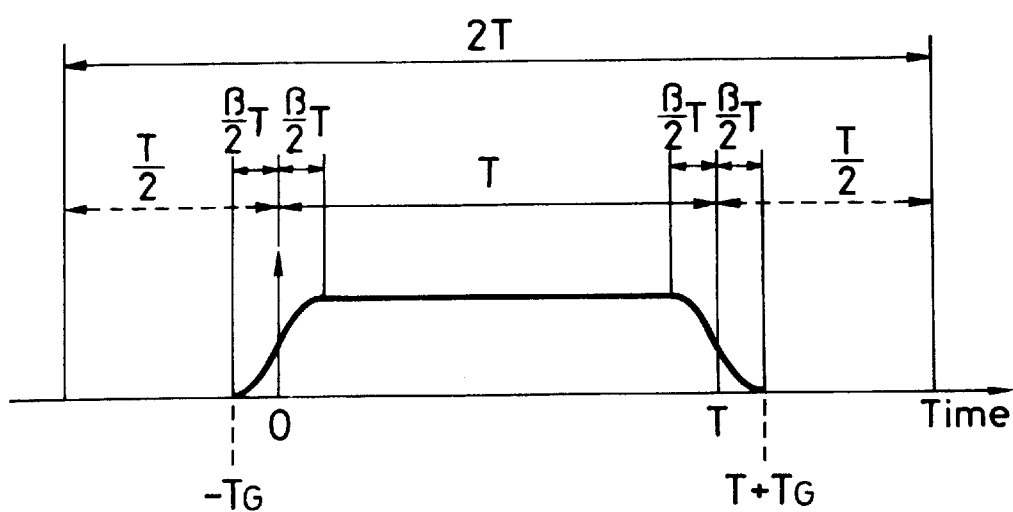
FIG. 15 is an explanatory diagram showing a time waveform for demodulation according to the sixth embodiment of the present invention.

A communication system according to a sixth embodiment of the present invention will be described with reference to FIGS. 14 and 15. In FIGS. 14 and 15, like parts corresponding to those of FIGS. 1 to 13 are marked with the same references and therefore need not be described in detail.

In this embodiment, the present invention is applied to a reception processing circuit of the communication system in which digital data is transmitted and received via radio waves similarly to the example shown in FIG. 6 and in which a reception signal is multiplied with the time waveform. FIG. 14 shows a reception processing circuit wherein the signal demodulated to the baseband signal by the mixer 53 shown in FIG. 6 is processed. In this embodiment, the baseband signal is a signal which results from orthogonally modulating signals of I component and Q component. The I component signal is supplied from a terminal 86a to a one-bit system analog-to-digital (A/D) converter 87a. The Q component signal is supplied from a terminal 86b to a one-bit system A/D converter 87b.

Each of the one-bit system A/D converters 87a, 87b outputs data of 1 or −1 as one-bit output. Therefore, when outputs of the two A/D converters 87a, 87b are combined, there can be obtained two-bit outputs of [1, 1], [1, −1], [−1, 1] and [−1, −1]. Incidentally, each of the A/D converters 87a, 87b is a converter capable of sampling data at $2^n$ times (e.g., 64 times). Outputs from the A/D converters 87a, 87b are supplied to five carrier multipliers 55, 56, 57, 58, 59.

Then, carriers having different frequencies obtained at input terminals 61, 62, 63, 64, 65 are supplied to multipliers 61a, 62a, 63a, 64a, 65a, respectively. Each of the multipliers 61a through 65a multiplies the carrier with a time waveform output from a time waveform generator 91. The time waveform generator 91 generates a time waveform of an arrangement shown in FIG. 15 at every one modulation unit.

Specifically, as shown in FIG. 15, this time waveform is composed of a data body portion interval T and ramp time portions of predetermined period $\beta T$ formed at a starting portion (timing of time zero) and an ending portion (timing of time T) of the data body portion interval T. In this case, the center of the ramp portion becomes a boundary portion of the data body portion and the ramp portions are extended from the boundary portions 0 and T by $(\beta/2)T$. Waveforms of the front and rear ramp time portions are curves of a linear function such as a sine wave and an odd function (function which becomes odd symmetry). In this embodiment, the $(\beta/2)T$ intervals, which are the extended intervals of the ramp time portions are made substantially coincident with the intervals (i.e., $-T_G$ to 0 and T to $T+T_G$) of the guard time portions of the modulation time waveform (see FIG. 9).

This demodulation time waveform is multiplied with complex conjugate values of respective carriers by the multipliers 61a to 65a. A sampling in this case is carried out at the same sampling rates of the A/D converters 87a, 87b.

Complex conjugate values in which the carriers are multiplied with the time waveform are supplied to the carrier multipliers 55, 56, 57, 58, 59, in which they are complex conjugate-multiplied with 2-bit outputs of the two A/D converters 87a, 87b. However, since the outputs of the A/D converters 87a, 87b are [1, 1], [1, −1], [−1 , 1] and [−1, −1], the complex conjugate-multiplication can be carried out by the adding processing.

Multiplied outputs of the carrier multipliers 55, 56, 57, 58, 59 are supplied to integrators 72a, 73a, 74a, 75a, 76a, respectively. The integrators 72a, 73a, 74a, 75a, 76a are adapted to integrate data at every one modulation unit during the period in which the time waveform is multiplied and outputs phase data indicative of the amount in which the phase is changed during the integrating period.

The phase data output from the integrators 72a, 73a, 74a, 75a, 76a are supplied to a differential demodulator 90, in which 2-bit data is demodulated from each phase data. As a consequence, 8-bit demodulated data in total is output to an output terminal 85. The differential demodulator 90 carries out the same demodulation processing as those of the phase multipliers 77 to 80 and the converters 81 to 84 according to the first embodiment shown in FIG. 6.

A rest of the arrangement is similar to that of the reception circuit shown in FIG. 6.

When the reception processing is carried out as described above, the reception signal is multiplied with the time waveform at every modulation unit and data transmitted at every one modulation unit can be demodulated satisfactorily. In particular, since the sampling is carried out by use of the one-bit system A/D converters, the carriers and the time waveform can be multiplied by the simple circuit arrangement and by the simple calculation. Therefore, as compared with the case that an A/D converter for producing data series of multi-value bits is used, it is possible to simplify the circuit arrangement which is required to obtain the same accuracy. Further, the processing circuit for multiplying the time waveform of the shape shown in FIG. 15 functions as a low-pass filter for reducing a noise of a high frequency component of a reception signal. Therefore, the low-pass filter need not be combined into the circuit and a satisfactory noiseless processing can be carried out without the low-pass filter.

Figure 16:
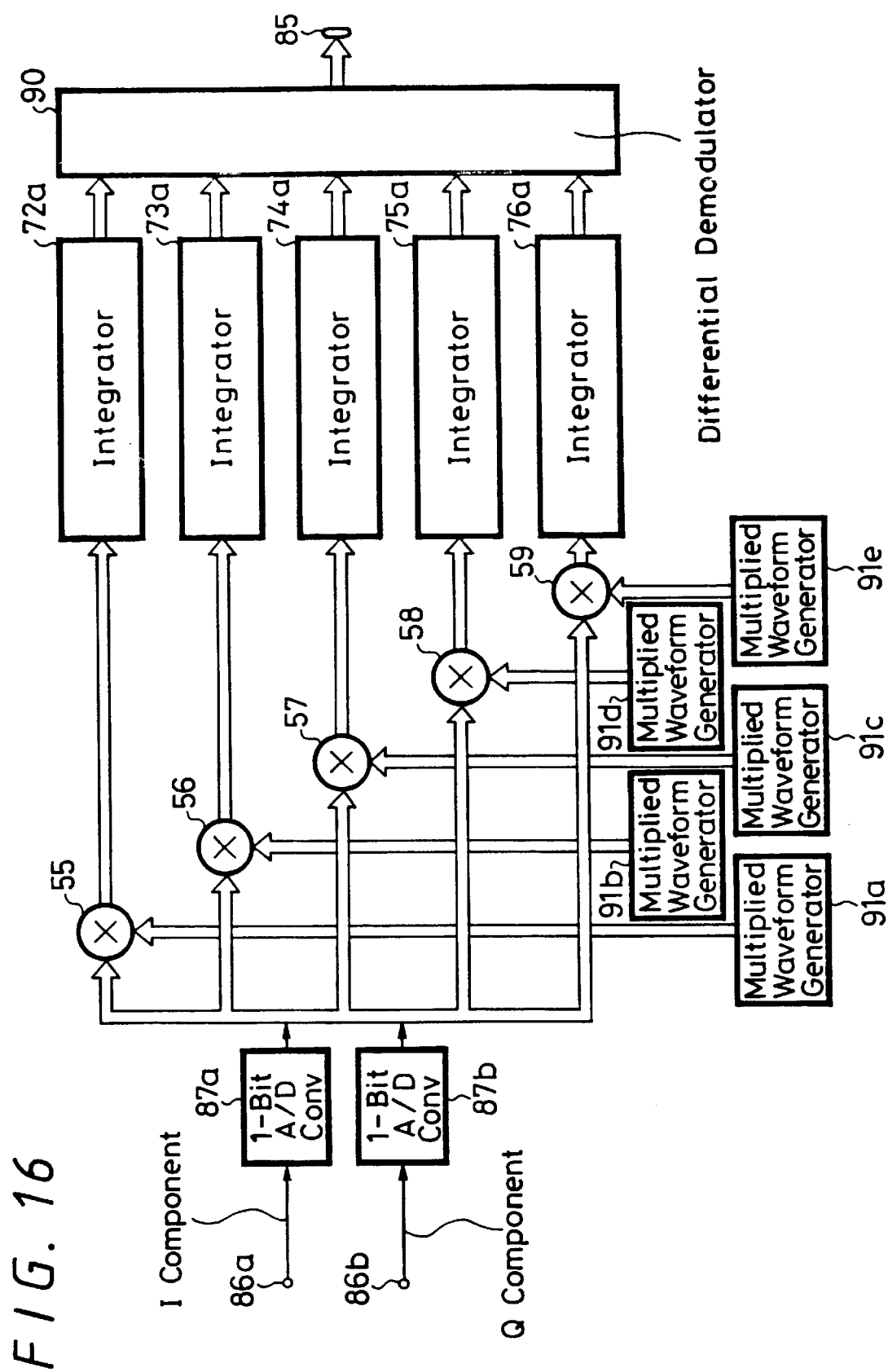
FIG. 16 is a block diagram showing an arrangement of a reception processing system of a communication system according to a seventh embodiment of the present invention.

A communication system according to a seventh embodiment of the present invention will be described with reference to FIG. 16. In FIG. 16, like parts corresponding to those of FIGS. 1 to 15 are marked with the same references and therefore need not be described in detail.

In this embodiment, the multiplication processing of the time waveform and the carriers in the reception processing according to the sixth embodiment shown in FIG. 14 is simplified and the processing circuit is arranged as shown in FIG. 16.

Specifically, according to this embodiment, as shown in FIG. 16, there are provided multiplied waveform generators 91*a*, 91*b*, 91*c*, 91*d*, 91*e* at every carrier in order to directly obtain the multiplied signals of the time waveform and the carriers. Outputs of the multiplied waveform generators 91*a*, 91*b*, 91*c*, 91*d*, 91*e* are supplied to the carrier multipliers 55, 56, 57, 58, 59, in which they are complex conjugate-multiplied with the reception signal.

The rest of the arrangement is similar to that of the reception circuit shown in FIG. 14.

In this embodiment, it is possible to obtain the multiplied signals of the carriers and the time waveform by the simple circuit arrangement composed of addition and bit-shifting.

The fact that the multiplied signals of the time waveform and the carriers can be obtained by the simple circuit arrangement without multiplication will be described with reference to the following equations. A received baseband signal is expressed by the following equation (17):

$$x(t) = \sum_{L=0}^{4} e^{j\phi_L} e^{-jL\omega_s t} \quad -\frac{1}{2}T \leq t < \left(1 + \frac{a}{2}\right)T \tag{17}$$

In the above equation (17), $\phi_L$ is the phase of a signal which results from modulating information in a differential QPSK (quadrature phase shift keying) fashion and $\omega_s$ is the fundamental carrier frequency. In this case, $T=2\pi/\omega_s$ is satisfied. Further, a is the ratio of the total length of the ramp time portions and the guard time portions relative to the data body portion. In this case, an inequality of a>0 is satisfied.

A sampling rate of the one-bit system A/D converter is selected to be N times the fundamental carrier frequency $\omega_s$. N is the number of 2's power and selected to be larger than the number (five) of carriers (N is 64).

The time waveform has a shape defined by the following equation (18):

$$u(t) = \begin{cases} 0, t < -\frac{\alpha T}{2}, t \geq T + \frac{\alpha T}{2} \\ 1, \frac{\alpha T}{2} \leq T < T - \frac{\alpha T}{2} \\ \frac{1}{2}\left[1 + \sin\left(\frac{2\pi}{\alpha T}t\right)\right], -\frac{\alpha T}{2} \leq t < \frac{\alpha T}{2} \\ \frac{1}{2}\left[1 + \sin\left\{\frac{2\pi}{\alpha T}(t-T)\right\}\right], T - \frac{\alpha T}{2} \leq t < T + \frac{\alpha T}{2} \end{cases} \tag{18}$$

If $\alpha=\frac{1}{8}$ and the time waveform is processed in a discrete fashion, then we have:

$$u(k) = \begin{cases} 0, k < -4 \quad k \geq 68 \\ 1, 4 \leq K < 60 \\ \frac{1}{2}\{1 + \sin(\frac{\pi}{4}k)\}, -4 \leq k < 4 \\ \frac{1}{2}[1 - \sin\{\frac{\pi}{4}(k-64)\}], 60 \leq k < 68 \end{cases}$$

where $$t \equiv \frac{2\pi}{N\omega s}$$

Then, the waveform of the carrier is processed at the sampling rate of $N\omega_s$ in a discrete fashion wherein $\omega_L = 1\omega_s$. The original waveform of the carrier is expressed by the following equation (20):

$$v_L(t) = \begin{cases} e^{jL\omega_s t}, -\frac{a}{2}T \leq t < \left(1 + \frac{a}{2}T\right) \\ 0, t < -\frac{aT}{2}, t \geq \left(1 + \frac{a}{2}\right)T \end{cases} \tag{20}$$

If a is selected to be ¼ that is longer than the above-mentioned time waveform and the carrier waveform is processed in a discrete fashion, then the original waveform of the carrier is expressed as:

$$v_L(m) = \begin{cases} ej2\pi\frac{L}{64}m, & -8 \leq m < 72 \\ 0, m < -8, & m \geq 72 \end{cases} \tag{21}$$

where $t \equiv m\frac{2\pi}{N\omega_s}$

A multiplied value of the time waveform and the carriers is obtained as follows:

$$u(k) \times v_L(k) = \begin{cases} 0, k < -4 \quad k \geq 68 \\ e^{j2\pi\frac{L}{64}}, 4 \leq k < 60 \\ \frac{1}{2}\{1 + \sin(\frac{\pi}{4}k)\}e^{j2\pi\frac{L}{64}}, -4 \leq k < 4 \\ \frac{1}{2}[1 - \sin\{\frac{\pi}{4}(k-64)\}]e^{j2\pi\frac{L}{64}k}, 60 \leq k < 68 \end{cases} \tag{22}$$

Sine and cosine tables are defined as follows.

$$s(i) = \sin\left(2\pi \frac{i}{64}\right) 0 \le i < 64 \quad (23)$$

$$c(i) = \sin\left(2\pi \frac{i}{64}\right) 0 \le i < 64$$

According to the sine and cosine tables, the multiplied value of the time waveform and the carriers is expressed by the following equation (24):

$$u(k) \times v_L(k) = \begin{cases} 0, k < -4, k \ge 68 \\ c(1k) + js(1k), 4 \le k < 60 \\ \frac{1}{2}\{1 + s(8k)\} \times \{c(1k) + js(1k)\}, -4 < k < 4 \\ \frac{1}{2}\{1 - s(8k)\} \times \{c(1k) + js(1k)\}, 60 \le k < 68 \end{cases} \quad (24)$$

Based on an addition theorem, the equation (24) can be substituted with the following equation (25):

$$S(8k) \times \{c(1k) + js(1k)\} = \quad (25)$$
$$\frac{1}{2}[\{s(8k+1k) + s(8k-1k)\} + j\{c(8k+1k) - c(8k-1k)\}]$$

Study of the equation (25) reveals that u(k)×v1(k) can be realized by calculation of index of tables, addition and division based on bit-shifting. Accordingly, the ROM tables and the simple calculation circuit can constitute the generator which generates the multiplied signals of the time waveform and the carriers.

Figure 17:
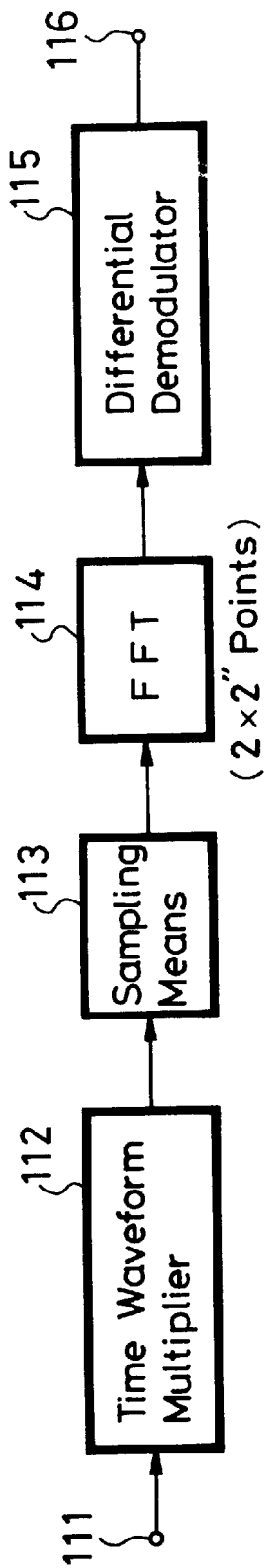
FIG. 17 is a block diagram showing an arrangement of a reception processing system of a communication system according to an eighth embodiment of the present invention.

A communication system according to an eighth embodiment of the present invention will hereinafter be described with reference to FIG. 17. In FIG. 17, like parts corresponding to those of FIGS. 1 to 16 are marked with the same references and therefore need not be described in detail.

In this embodiment, there is provided a reception circuit for receiving and demodulating the transmission signal which had been modulated by multiplication of the time waveform according to the second embodiment shown in FIG. 9. FIG. 17 shows a circuit arrangement for processing a received baseband signal. As shown in FIG. 17, the received baseband signal is supplied to an input terminal 111. This baseband signal is supplied to a time waveform multiplying circuit 112, wherein it is multiplied with the time waveform shown in FIG. 9 at every one modulation unit. The time waveform multiplying circuit 112 might be formed of a cosine rolloff filter. The resultant signal with which the time waveform is multiplied is supplied to a sampling means (i.e., A/D converter) 113 where a sampling of 2×2$^N$ is carried out. 2$^N$ is selected to be larger than the number of carriers.

An output of the sampling means 113 is supplied to a fast Fourier transform circuit (referred to hereinafter as "FFT circuit") 114 which outputs demodulated signals of the number of the carriers by using data at the sampling points obtained during a time twice as long as the data body portion (data obtained during the time 2T twice as long as the data body portion T as shown in FIG. 15) according to the calculation based on the FFT. This demodulation processing is the same as that using the carrier multipliers 55 to 59 shown in FIG. 6. The signal demodulated from a plurality of carriers is supplied to a differential demodulator 115 which demodulates data based on a phase difference of respective systems. The differential demodulator 115 is the demodulator which carries out the same demodulation as those carried out by the phase multipliers 77 to 80 and the converters 81 to 84 in the first embodiment shown in FIG. 6. The demodulated data is obtained at an output terminal 116.

According to the above-mentioned demodulation processing, since the boundary portions of the data body portion and the guard time portions as the time waveform are odd-symmetrical waveforms, the time waveform serving as the gate signal does not contain the high frequency band component. Therefore, as compared with the case that the gate signal of square wave is used, it is possible to lessen a noise obtained at other frequencies that a desired frequency.

A communication system according to a ninth embodiment of the present invention will be described with reference to FIGS. 18 to 21. In FIGS. 18 to 21, like parts corresponding to those of FIGS. 1 to 17 are marked with the same references and therefore need not be described in detail.

Figure 18:
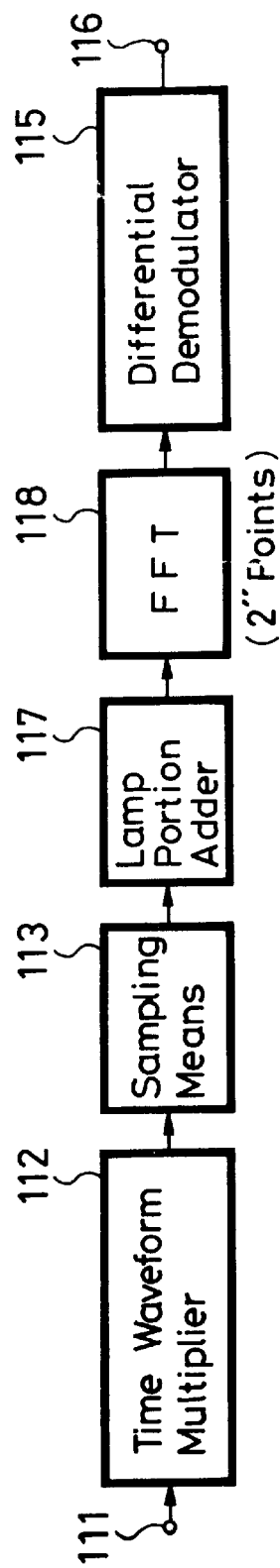
FIG. 18 is a block diagram showing an arrangement of a reception processing system of a communication system according to a ninth embodiment of the present invention.

In this embodiment, there is provided a reception circuit for receiving and demodulating a transmission signal modulated by multiplication of the time waveform in the second embodiment shown in FIG. 9. This reception circuit can realize the demodulation processing shown in the eight embodiment of FIG. 17 by a simple circuit arrangement. Specifically, as shown in FIG. 18, the baseband signal applied to the input terminal 111 is supplied to the time waveform multiplying circuit 112, in which it is multiplied with the time waveform shown in FIG. 9 at every one modulation unit. The signal multiplied with the time waveform is supplied to the sampling means (i.e., A/D converter) 113 which carries out a sampling of 2×2$^N$ (2$^N$ is the number of carriers or greater).

An output of the sampling means 113 is supplied to a ramp portion adding circuit 117. The ramp portion adding circuit 117 allow all data to be held during the time T by adding data spaced apart from the center of data body portion by T/2 or greater to the points distant by T. Specifically, as shown in FIG. 19A, data at a ramp portion shown by al is added to a portion a2 which is distant from the ramp portion al by T. Also, data at a ramp portion shown by b1 is added to a portion b2 which is distant from the portion b1 by T, thereby obtaining a waveform provided when all data are gated by a certain square wave during the time T, as shown in FIG. 19B. In the case of the modulated signal to which the circuit according to this embodiment is applied, the signal becomes the same signal at the position distant by the time T. Therefore, by the addition, phase information contained in the modulated signal can be prevented from being disturbed.

An output of the lamp portion adding circuit 117 is supplied to a FFT circuit 118 which obtains demodulated signals of the number of carriers by use of data at the sampling points (2$^N$ points) of time of the data body portion T according to the calculation of FFT. This demodulation processing is the same as that carried out by the carrier multipliers 55 to 59 in FIG. 6. A signal demodulated from a plurality of carriers is supplied to the differential demodulator 115 which demodulates data on the basis of phase difference of respective systems.

The rest of the arrangement is similar to that of the demodulation processing circuit shown in FIG. 17.

In the case of this embodiment, while the lamp portions are added and data are demodulated by use of only data obtained at the sampling points (2$^N$ points) during the time of the data body portion T at every one modulation unit so that only the data obtained at the half sampling points as compared with the example shown in FIG. 17, it is possible to obtain exactly the same calculated results as those of the embodiment shown in FIG. 17. Accordingly, the amount of data is reduced to the half and the amount of calculation processing can be lessened. As a result, the circuit arrangement can be simplified.

Figure 20:
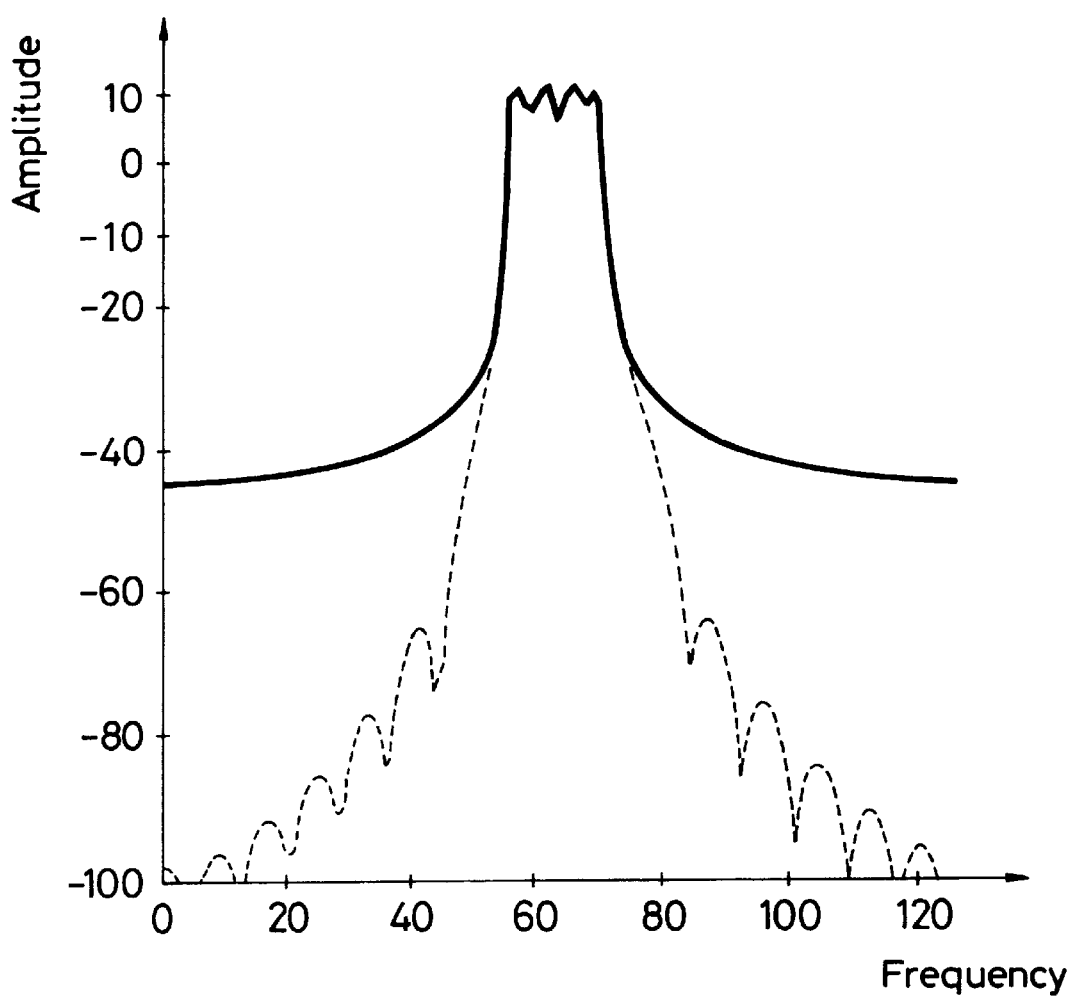
FIG. 20 is a waveform diagram showing attenuated states of frequencies other than a desired frequency by the time waveform.

FIG. 20 shows the state that other frequencies than the desired frequency are attenuated when data is demodulated by the circuit shown in FIGS. 17 or 18. As compared with the case that the square wave is used as the time waveform (characteristic shown by solid curve in FIG. 20), when the time waveform according to this embodiment is used (characteristic shown by dotted curve in FIG. 20), it is possible to considerably attenuate bands other than the band of the desired frequency.

Figure 21:
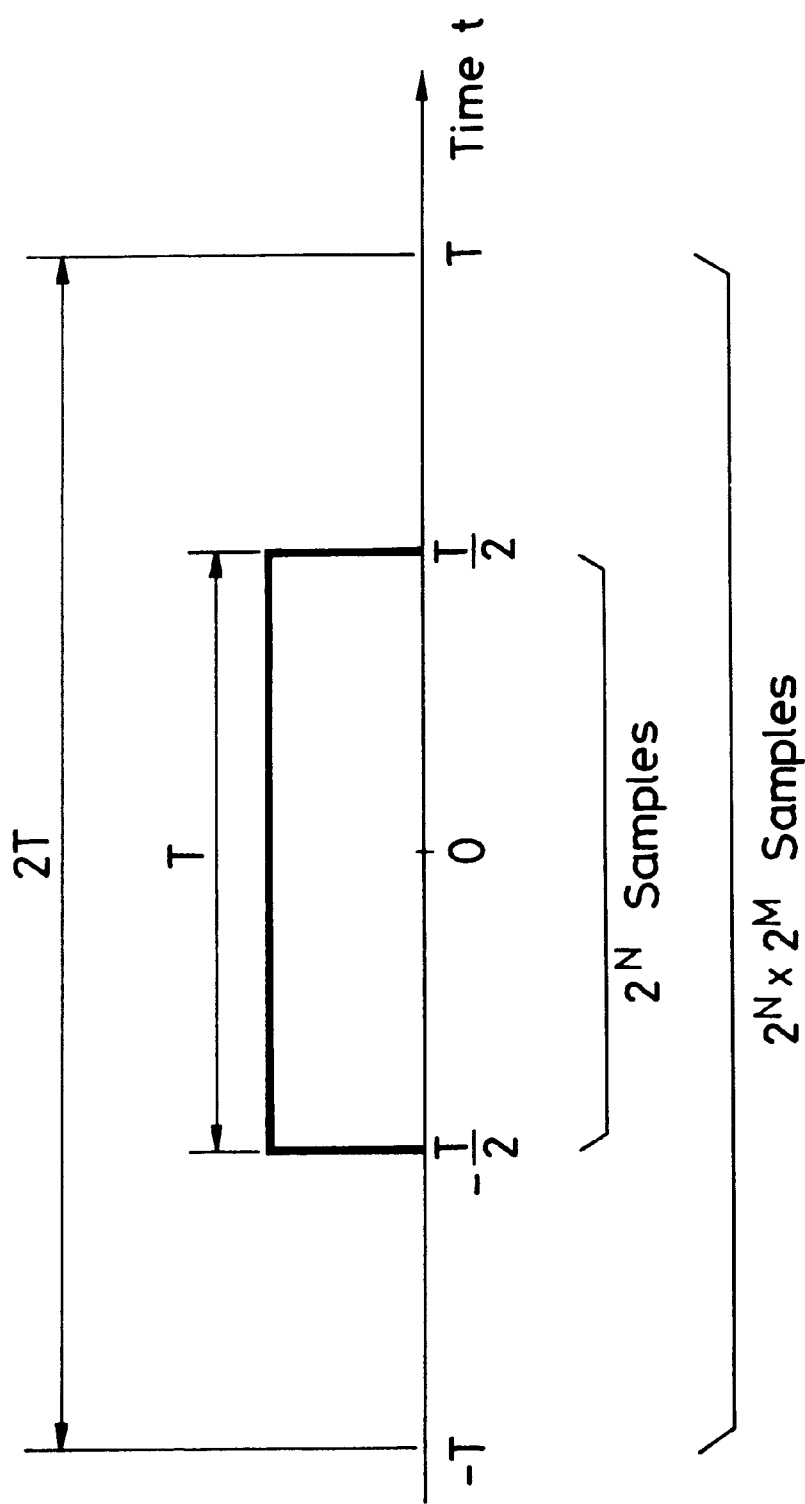
FIG. 21 is an explanatory diagram showing examples of waveforms wherein a calculation of FFT is carried out.

The fact that the value obtained by processing the data by the FFT during the time 2T (sampling points between –T and T with reference to 0 as shown in FIG. 21) by the circuit shown in FIG. 17 and the value obtained by processing data by the FFT during the time T (sampling points between –T/2 and T/2 with reference to 0 as shown in FIG. 21) by the circuit shown in FIG. 18 will be described with reference to the following equations.

If there exist d multi-carrier signals during the interval of –T/2≦t<T/2 shown in FIG. 21 and a fundamental frequency of a carrier is $\omega_c = 2\pi/T$, then a signal x(t) is expressed as follows:

$$x(t) = u(t) \sum_{L=0}^{d-1} e^{j\phi L} \times e^{jL\omega_c t} \quad (26)$$

$$u(t) = \begin{cases} 1 & |t| \geq \frac{T}{2} \\ 0 & |t| > \frac{T}{2} \end{cases}$$

where $\phi_L$ is phase information on the carrier.

If $2 \times 2^N$ data are sampled during the 2T period, then the signal x(t) is expressed as follows:

$$x_n \equiv x\left(\frac{T}{2^N}n\right) = u_n \sum_{L=0}^{d-1} e^{j\phi L} \times e^{jL\omega_c \frac{T}{2^N}n} \quad (27)$$

$$u_n = \begin{cases} 1, & -2^{N-1} \leq n < 2^{N-1} \\ 0, & n < -2^{N-1}, n \geq 2^{N-1} \end{cases}$$

The sampling frequency $\omega_s$ is expressed as $\omega_s = 2^N \times \omega_c$. Since there are $2 \times 2^N$ sampling points when the calculation of FFT is effected during the interval of –T≦t<T, an output corresponding to the following frequency can be obtained.

$$\omega_k = \frac{\omega_s}{2 \times 2^N} \times k = \frac{k}{2}\omega_c \quad k = 0, 1, \ldots 2^{N-1} \quad (28)$$

Indexes of frequency that exist as a remarkable carrier are presented as k=2r and r=0, 1, ... d–1. Therefore, the result obtained by the calculation of the FFT is expressed by the following equation (29):

$$X_k \equiv X(\omega_k) = \sum_{n=-2^N}^{2^{N-1}} \left\{ u_n \sum_{L=0}^{d-1} e^{j\phi L} \times e^{jL\omega_c \frac{T}{2^N}n} \right\} e^{-j\omega k \cdot n \cdot T} \quad (29)$$

Then, if k is expressed by r and the characteristic of $u_n$ is used, then the following equation is established:

$$X_r = \sum_{n=-2^{M-1}}^{2^{N-1}-1} \left\{ \sum_{L=0}^{d-1} e^{j\phi L} \times e^{jL\omega_c \frac{T}{2M}n} \right\} e^{-jr\omega cnT} \quad (30)$$

On the other hand, when the calculation of the FFT is carried out during the interval of –T/2≦t<T/2, there are $2^N$ sampling points so that an output corresponding to the following frequency can be obtained.

$$\omega_k = \frac{\omega_s}{2^N}k = k\omega_c \quad k = 0, 1, \ldots 2^{N-1} \quad (31)$$

Indexes of frequency existing as a remarkable carrier are β=0, 1, ... d–1. The result obtained by the calculation of the FFT is expressed by the following equation (32) and a value of a frequency component corresponding to the remarkable index is expressed by the following equation (33):

$$X_k \equiv X(\omega_k) = \sum_{n=-2^{N-1}}^{2^{N-1}-1} \left\{ u_n \sum_{L=0}^{d-1} e^{j\phi L} \times e^{jL\omega_c \frac{T}{2^N}n} \right\} e^{-j\omega knT} \quad (32)$$

$$X_\beta = \sum_{n=-2^{N-1}}^{2^{N-1}-1} \left\{ \sum_{L=0}^{d-1} e^{j\phi L} \cdot e^{jL\omega_c \frac{T}{2^N}n} \right\} e^{-j\beta\omega cnT} \quad (33)$$

The equation (33) is the same as the equation (30) and the calculation of the FFT for the time 2T and the calculation of the FFT for the time T output the same output for kωc (k=0, 1, ... d–1).

Then, the reason that the calculated result of the FFT effected when the ramp portions are added and the calculated result of the FFT effected when the ramp portions are not added become the same for the necessary frequency (when a transmission line characteristic is flat) in the circuit shown in FIG. 18 will be described below.

Figure 22:
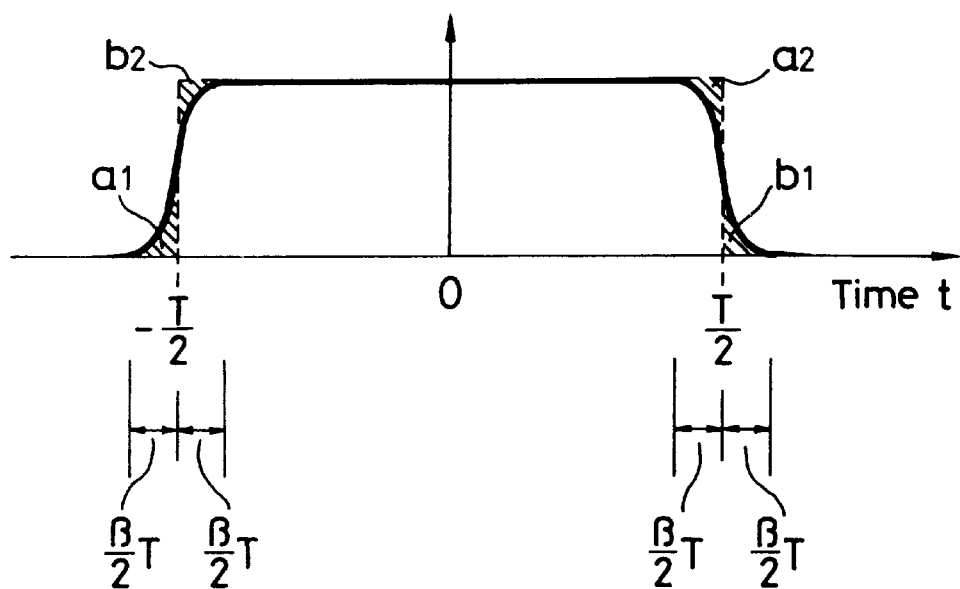
FIG. 22 is a waveform diagram used to explain a time waveform.

The time waveform shown in FIG. 22 is expressed by the following equation (34):

$$x(t) = v(t) \sum_{L=0}^{d-1} e^{j\phi L} e^{jL\omega_c t} \quad (34)$$

$$v(t) = \begin{cases} 1 : -\frac{T}{2}(1-\beta) \leq t < \frac{T}{2}(1-\beta) \\ 0 : t < -\frac{T}{2}(1+\beta), t \geq \frac{T}{2}(1+\beta) \\ \frac{1}{2}\left[1 + \sin\left\{\frac{\pi}{\beta T}\left(t + \frac{T}{2}\right)\right\}\right] : -\frac{1}{2}(1-\beta) \leq t < -\frac{T}{2}(1-\beta) \\ \frac{1}{2}\left[1 - \sin\left\{\frac{\pi}{\beta T}\left(t - \frac{T}{2}\right)\right\}\right] : \frac{1}{2}(1-\beta) \leq t < \frac{T}{2}(1+\beta) \end{cases}$$

If the calculated results of the Fourier transform of the continuous time system are in agreement with each other, then it is to be noted that the calculated results of the discrete FFT also are agreed with each other. Therefore, the following equations (35) and (36) prove that the necessary frequencies are in agreement with each other.

$$X(\omega) = \int_{-\frac{T}{2}(1+\beta)}^{\frac{T}{2}(1+\beta)} v(t) \sum_{L=0}^{d-1} e^{j\phi L} e^{jL\omega_c t} \cdot e^{-j\omega t} dt \quad (35)$$

-continued $$X'(\omega) = \int_{-\frac{T}{2}}^{\frac{T}{2}} \sum_{L=0}^{d-1} e^{j\phi L} e^{jL\omega ct} \times e^{-j\omega t} dt \qquad (36)$$

The equation (35) is modified as follows:

$$X(\omega) = \int_{-\frac{T}{2}(1+\beta)}^{\frac{T}{2}(1+\beta)} \frac{1}{2}\left[1 + \sin\left\{\frac{\pi}{\beta T}\left(t + \frac{T}{2}\right)\right\}\right] \sum_{L=0}^{d-1} e^{j\phi L} e^{j(L\omega c - \omega)t} dt + \qquad (37)$$

$$\int_{-\frac{T}{2}(1-\beta)}^{\frac{T}{2}(1-\beta)} \sum_{L=0}^{d-1} e^{j\phi L} e^{j(L\omega c - \omega)t} dt +$$

$$\int_{\frac{T}{2}(1-\beta)}^{\frac{T}{2}(1+\beta)} \frac{1}{2}\left[1 - \sin\left\{\frac{\pi}{BT}\left(t - \frac{T}{2}\right)\right\}\right] \sum_{L=0}^{d-1} e^{j\phi L} e^{j(L\omega c - \omega)} dt$$

Replacing the third term of the equation (37) with t'=t−T yields the following equation (38):

The third term of the equation (37) is expressed as:

$$= \int_{-\frac{T}{2}(1+\beta)}^{-\frac{T}{2}(1-\beta)} \frac{1}{2}\left[1 - \sin\left\{\frac{\pi}{\beta T}\left(t' + \frac{T}{2}\right)\right\}\right] \sum_{L=0}^{d-1} e^{j\phi L} \times e^{j(L\omega c - \omega)t - \omega T} dt \qquad (38)$$

If $m\omega_c$ (m=0, 1, . . . d−1) is selected as ω, then the first terms of the equations (38) and (37) and other codes than the sine portions are in agreement with one another. Therefore, the equation (37) yields the following equation (39) which can prove that the results of the addition of the ramp portion become the same.

$$X(m\omega c) = \qquad (39)$$

$$\int_{-\frac{T}{2}(1+\beta)}^{-\frac{T}{2}(1-\beta)} \sum_{L=0}^{d-1} e^{j\phi L} e^{j(L-m)\omega ct} dt + \int_{-\frac{T}{2}(1-\beta)}^{\frac{T}{2}(1-\beta)} \sum_{L=0}^{d-1} e^{j\phi L} e^{j(L-m)\omega ct} dt +$$

$$\int_{-\frac{T}{2}}^{\frac{T}{2}} \sum_{L=0}^{d-1} e^{j\phi L} e^{j(L-m)\omega ct} dt (\because \text{ from periodicity}) = X'(m\omega_c)$$

According to the present invention, since a plurality of carriers having different frequencies are simultaneously transmitted and data are transmitted on the basis of a phase difference between the carriers, it becomes possible to demodulate transmitted data only by detecting the phase of each carrier.

In this case, since a plurality of carriers are converted into signals each having a constant frequency interval, it becomes easy to detect the phase difference between the carriers.

The difference between the advanced phases of carriers during one modulation unit time where the phase difference between the carriers to be a multiple slightly larger than 2π and then transmitted. The reception side detects transmitted data by judging the phase difference of one modulation unit during a time where the difference between the advanced phase of carriers becomes 2π. Thus, it is possible to accurately detect transmitted data without being affected by intersymbol interference or the like.

In each transmission processing, since the communication system includes the limiter for amplitude-limiting a mixed signal of respective modulated carriers and the filter for filtering out the output of the limiter wherein the limiter limits the amplitude at a rate about 1.5 times or greater than the standard deviation of amplitude distribution and the output from the filter is transmitted, even though the peak-to-peak value of the transmitted waveform becomes large when the carriers are mixed, data can be satisfactorily transmitted without being deteriorated.

According to the present invention, since the communication system includes the modulating means for outputting a modulated output waveform in which the amplitude probability distribution is approximate to the Gaussian distribution, the limiter for amplitude-limiting the output waveform of this modulating means and the filter for filtering out the output from this limiter wherein the limiter limits the amplitude at a rate about 1.5 times or greater than the standard deviation of the amplitude distribution and the output of the filter is transmitted, the transmission waveform having the large peak-to-peak value can be satisfactorily transmitted without being deteriorated.

Since the predetermined time waveform is multiplied with the carrier at every one modulation unit time and then transmitted as the above-mentioned transmission processing, it become easy for the reception side to detect the data transmitted based on the phase difference.

When the time waveform is multiplied with the carriers, the predetermined time waveform is multiplied with the carriers having different frequencies so that the multiplication of time waveforms can be realized by the simple calculation.

When the predetermined time waveform is directly multiplied with the carriers, there is provided the table for obtaining values which result from analyzing the multiplied values of the carrier frequencies and the time waveform so that the communication system can be realized by the simple arrangement.

Since the phase values which are transmitted data are supplied as initial phase values at every carrier and the phase values are sequentially added at every sample interval to thereby directly obtain the phase-modulated signal, the phase-modulated signals can be directly obtained by the simple arrangement using the ROM table without providing the circuit for generating carriers.

Since a plurality of carriers having different frequencies are simultaneously transmitted and the received signal is sampled by the one-bit system analog-to-digital converter and multiplied with the time waveform, thereby demodulated as the reception processing means for receiving data transmitted based on the phase difference between the carriers, it is possible to obtain an accuracy equal to or higher than that obtained when the received signal is sampled by a multi-value-bit system analog-to-digital converter by the simple circuit arrangement.

When the received signal is sampled by the one-bit system analog-to-digital converter and demodulated, there are provided the generating means for generating signals which result from multiplying the carriers and the predetermined time waveform at every carrier and the tables for obtaining the values which result from analyzing the multiplied values of the carrier frequencies and the time waveform are provided as the respective generating means. Therefore, it is possible to carry out the multiplication of the time waveform for demodulation by the simple arrangement.

Upon reception processing, since the data body portion formed of one modulation time is multiplied with the particular time waveform defined by the guard time portion accompanying with the data body portion and the received signal is demodulated, it is possible to satisfactorily extract the data body portion by the time waveform.

If the time waveform which is the odd symmetric waveform is provided at the boundary between the data body portion and the guard time portion and which has the constant value in other portions, then it is possible to satisfactorily demodulate data contained in the data body portion without noise.

Since the sampling means performs the sampling of the number of 2's power which is larger than the number of carriers per modulation times, sample values of two modulation time are prepared about the data body portion of one modulation time and the sample values of two modulation time are demodulated by a fast Fourier transform, it is possible to realize the demodulation processing by the simple circuit arrangement.

Furthermore, since the sampling means performs the sampling of the number of 2's power which is larger than the number of carriers per modulation time, sample values of the data body portion and the guard time portion of one modulation time are prepared, the guard time portion of the sample values is added to the data body portion spaced by one modulation time by the adding circuit and the sample value of one modulation time obtained by the addition is demodulated by the fast Fourier transform, it is possible to realize the demodulation processing by the simple circuit arrangement.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A communication system comprising:

modulating means for outputting a modulated output waveform in which an amplitude probability distribution is approximate to a Gaussian distribution;

a limiter for amplitude-limiting said modulated output waveform of said modulating means; and a filter for filtering an output of said limiter, wherein said limiter amplitude-limits said modulated output waveform at a rate of about 1.5 times or greater of standard deviation of amplitude distribution and an output of said filter is transmitted.

2. The communication system according to claim 1, wherein said modulating means comprises:

converting means for converting transmission data into phase difference data;

means for generating reference phase data;

multiplying means for multiplying said reference phase data and said phase difference data;

first means for modulating said reference phase data by a carrier having a first frequency;

second means for modulating phase data output from said multiplying means by a plurality of carriers having respective frequencies different from each other and from said first frequency; and mixing means for mixing modulated signals output from said first means for modulating and said second means for modulating to produce said modulated output waveform.

3. The communication system according to claim 2, wherein said modulating means sets a difference between advanced phase of said plurality of carriers in one modulation unit time during which phase difference between carriers of said plurality of carriers is set to be a multiple slightly larger than 2Π.

4. The communication system according to claim 1, wherein said filter comprises a low-pass filter.

* * * * *